United States Patent
Sato

(10) Patent No.: US 9,323,493 B2
(45) Date of Patent: Apr. 26, 2016

(54) INFORMATION PROCESSING APPARATUS AND CONTROL METHOD, AND CONTROL PROGRAM

(75) Inventor: Junko Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1668 days.

(21) Appl. No.: 12/145,354

(22) Filed: Jun. 24, 2008

(65) Prior Publication Data

US 2008/0316517 A1 Dec. 25, 2008

(30) Foreign Application Priority Data

Jun. 25, 2007 (JP) ................................ 2007-166356

(51) Int. Cl.
 *G06F 3/12* (2006.01)
 *G06F 15/00* (2006.01)

(52) U.S. Cl.
 CPC ............ *G06F 3/1284* (2013.01); *G06F 3/1204* (2013.01); *G06F 3/1207* (2013.01); *G06F 3/1208* (2013.01); *G06F 3/1226* (2013.01); *G06F 3/1243* (2013.01); *G06F 3/1256* (2013.01); *G06F 3/1288* (2013.01); *B42P 2261/04* (2013.01); *Y02P 20/52* (2015.11)

(58) Field of Classification Search
 None
 See application file for complete search history.

(56) References Cited

U.S. PATENT DOCUMENTS

| 7,170,619 | B2* | 1/2007 | Miyata | 358/1.15 |
| 2002/0033963 | A1* | 3/2002 | Miyata | 358/1.15 |
| 2002/0054008 | A1* | 5/2002 | Aikawa | 345/100 |
| 2003/0184787 | A1* | 10/2003 | Kuroda et al. | 358/1.13 |
| 2005/0111015 | A1* | 5/2005 | Tsujimoto | 358/1.9 |
| 2005/0278190 | A1* | 12/2005 | Nakai et al. | 705/1 |
| 2006/0221370 | A1* | 10/2006 | Iida | 358/1.13 |
| 2006/0279780 | A1* | 12/2006 | Anno et al. | 358/1.15 |
| 2007/0005561 | A1* | 1/2007 | Sakura et al. | 707/1 |
| 2007/0035771 | A1* | 2/2007 | Kitamaru | 358/1.18 |

FOREIGN PATENT DOCUMENTS

| EP | 1189134 | 3/2002 | |
| JP | 2005-107845 | * 4/2005 | ............... G06F 3/12 |
| JP | 2005-107845 A | 4/2005 | |
| JP | 2005-174226 A | 6/2005 | |
| JP | 2007-58563 A | 3/2007 | |
| KR | 10-2003-0089580 | 11/2003 | |
| KR | 10-0481899 | 3/2005 | |

* cited by examiner

*Primary Examiner* — Mohammad Ghayour
*Assistant Examiner* — Pawandeep Dhingra
(74) *Attorney, Agent, or Firm* — Canon USA Inc. IP Division

(57) ABSTRACT

An information processing apparatus capable of communicating with printers includes: an application to set printing setting information as a document to be printed; a printer driver to generate printing data by employing the printing setting information specified by the application and the document; a determining unit to determine whether the printing setting information to be set using the printer driver is included in the printing setting information set using the application, using selected printer attributes and printing setting information set using the application; and a display to display information relating to printing settings to be set using the printer driver of the selected printer in a case the determining unit determines that the printing setting information to be set using the printer driver is included. If a printer is selected which cannot be controlled by a binding application, the binding application displays items to be set with a printer driver.

12 Claims, 29 Drawing Sheets

FIG. 4

| NO | ATTRIBUTE INFORMATION | | NOTES |
|---|---|---|---|
| 1 | PRINTING METHOD | SIMPLEX / DUPLEX / BINDING PRINTING | |
| 2 | SHEET SIZE | DOCUMENT SIZE / FIXED SIZE | • SPECIFY Z-FOLD IN THE CASE OF SPECIFYING "A4 + A3", "B4 + B3", "LETTER + LEGAL (11 × 17)"<br>• DOCUMENT SIZE FOR CHAPTER 1/PAGE 1 IS AUTOMATICALLY SELECTED IN THE CASE THAT BINDING PRINTING OR N-up PRINTING IS SPECIFIED |
| 3 | SHEET DIRECTION | PORTRAIT / LANDSCAPE | • CAN BE SELECTED ONLY IN THE CASE OF FIXED SIZE |
| 4 | MARGIN, MARGIN DIRECTION | | • SHIFT AND ENLARGE/REDUCE CAN BE SPECIFIED |
| 5 | N-up PRINTING | NUMBER OF PAGES, PLACEMENT ORDER, BORDER LINES, DISPOSAL LOCATION AND SO FORTH | • 9 PATTERNS FOR PLACEMENT ORDER<br>• SAME-SIZE PRINTING CAN BE SPECIFIED |
| 6 | ENLARGE/REDUCE | ON/OFF | • IN THE CASE OF SELECTING FIXED SIZE FOR SHEET SIZE OR N-up PRINTING, SPECIFY ON AUTOMATICALLY, CAN SPECIFY OFF |
| 7 | WATERMARK | | • CAN BE INDIVIDUALLY SPECIFIED FOR LOGICAL PAGE UNITS OR PHYSICAL PAGE UNITS       • ALL CHAPTERS / ALL PAGES APPLICABLE |
| 8 | HEADER/FOOTER | | • CAN BE INDIVIDUALLY SPECIFIED FOR THEORETICAL PAGE UNITS OR PHYSICAL PAGE UNITS       • ALL CHAPTERS / ALL PAGES APPLICABLE |
| 9 | SHEET OUTPUT DIRECTION | STAPLING / HOLE-PUNCHING | • STAPLING / HOLE-PUNCHING ONLY FOR SIMPLEX / DUPLEX PRINTING<br>• STAPLING CAN BE 1 LOCATION OR 2 LOCATIONS |
| 10 | BINDING DETAILS | OPENING DIRECTION, INNER MARGIN, ENLARGING OR REDUCING SPECIFICATION, MARGINS, VOLUME SPECIFICATION AND SO FORTH | • ONLY FOR BINDING PRINTING |
| 11 | COVER / BACK COVER | | • PRINTING SPECIFICATION AS TO 1/2 COVER, 1/2 BACK COVER<br>• SPECIFY SHEET SUPPLY OPENING (INCLUDE INSERTER) |
| 12 | INDEX SHEET | | • TEXT STRING PRINTING TO INDEX PORTION AND ANNOTATION TO INDEX SHEET CAN BE SET<br>• BINDING PRINTING CANNOT BE SPECIFIED |
| 13 | FACING SHEET | | • SPECIFY SHEET SUPPLY OPENING (INCLUDE INSERTER)<br>• CAN PRINT DOCUMENT DATA ON INSERTED SHEET<br>• BINDING PRINTING CANNOT BE SPECIFIED |
| 14 | CHAPTER BREAK | "NONE", "PAGE BREAK", "CHANGE SHEET" | • FIX TO "CHANGE SHEET" IN CASE OF SPECIFYING INDEX SHEET, FACING SHEET<br>• USE "CHANGE SHEET" FOR SIMPLEX PRINTING |

FIG. 5

| NO | ATTRIBUTE INFORMATION | | REFERENCE |
|---|---|---|---|
| 1 | SHEET SIZE | DOCUMENT SIZE / FIXED SIZE | · AUTOMATICALLY SPECIFY "CHANGE SHEET" IN THE CASE OF SELECTING FIXED SIZE<br>· IN THE CASE THE MULTIPLE SHEETS ARE SELECTED FOR A BOOK, CHANGEABLE ONLY FOR SPECIFIED SHEETS, SHEET SIZE IS CHANGEABLE ALSO WHEN SPECIFYING TO MATCH BOOK |
| 2 | SHEET DIRECTION | PORTRAIT / LANDSCAPE | · CAN BE SELECTED ONLY IN THE CASE OF FIXED SIZE |
| 3 | SPECIFY N-up PRINTING | NUMBER OF PAGES, PLACEMENT ORDER, BORDER LINES, DISPOSAL LOCATION AND SO FORTH | · 9 PATTERNS FOR PLACEMENT ORDER<br>· SAME-SIZE PRINTING CAN BE SPECIFIED |
| 4 | ENLARGE/REDUCE | ON/OFF | · IN THE CASE OF SELECTING FIXED SIZE FOR SHEET SIZE OR N-up PRINTING, SPECIFY ON AUTOMATICALLY, CAN SPECIFY OFF |
| 5 | WATERMARK | DISPLAY / NO DISPLAY | · SPECIFY WHETHER OR NOT ALL WATERMARKS SPECIFIED IN BOOK ARE TO BE DISPLAYED |
| 6 | HEADER/FOOTER | DISPLAY / NO DISPLAY | · SPECIFY WHETHER OR NOT ALL HEADERS/FOOTERS SPECIFIED IN BOOK ARE TO BE DISPLAYED |
| 7 | SHEET OUTPUT DIRECTION | STAPLING | · OFF CAN BE SPECIFIED IN THE CASE OF SPECIFYING STAPLING FOR A BOOK; ON IS DEFAULT |

FIG. 6

| NO | ATTRIBUTE INFORMATION | | REFERENCE |
|---|---|---|---|
| 1 | SPECIFY PAGE ROTATION | | · CAN SPECIFY 0/90/180/270 DEGREES |
| 2 | WATERMARK | DISPLAY/ NO DISPLAY | · SPECIFY WHETHER OR NOT ALL WATERMARKS SPECIFIED IN BOOK ARE TO BE DISPLAYED |
| 3 | HEADER/FOOTER | DISPLAY/ NO DISPLAY | · SPECIFY WHETHER OR NOT ALL HEADERS/FOOTERS SPECIFIED IN BOOK ARE TO BE DISPLAYED |
| 4 | ZOOM | 50% TO 200% | · SPECIFY CORRELATIVE SIZE WHEN THE SIZE FITTING A VIRTUAL LOGICAL PAGE REGION IS 100% |
| 5 | PLACEMENT LOCATION | | · SPECIFY NINE FIXED PATTERNS AND OPTICAL PLACEMENT |
| 6 | ANNOTATION | | |
| 7 | Variable ITEM | | |
| 8 | PAGE DIVISION | | |

FIG. 14

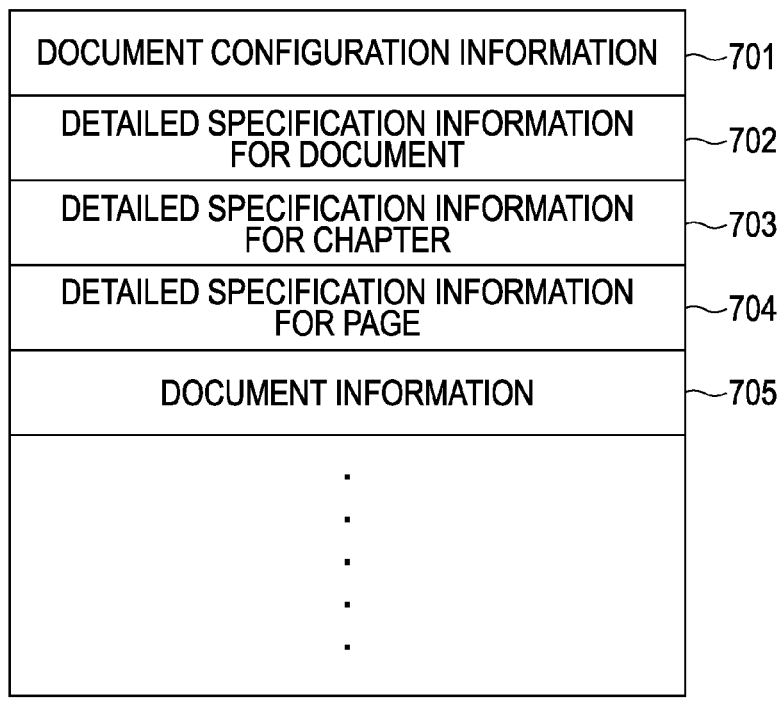

| DOCUMENT CONFIGURATION INFORMATION | ~701 |
| DETAILED SPECIFICATION INFORMATION FOR DOCUMENT | ~702 |
| DETAILED SPECIFICATION INFORMATION FOR CHAPTER | ~703 |
| DETAILED SPECIFICATION INFORMATION FOR PAGE | ~704 |
| DOCUMENT INFORMATION | ~705 |

FIG. 15

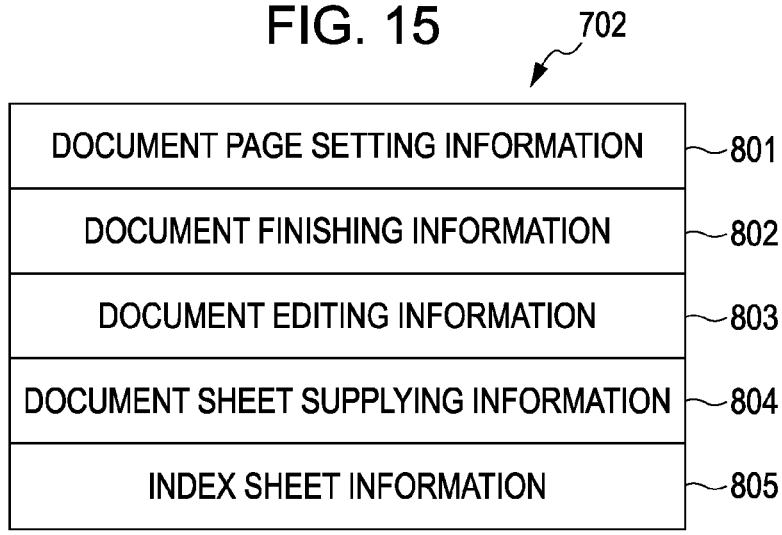

| DOCUMENT PAGE SETTING INFORMATION | ~801 |
| DOCUMENT FINISHING INFORMATION | ~802 |
| DOCUMENT EDITING INFORMATION | ~803 |
| DOCUMENT SHEET SUPPLYING INFORMATION | ~804 |
| INDEX SHEET INFORMATION | ~805 |

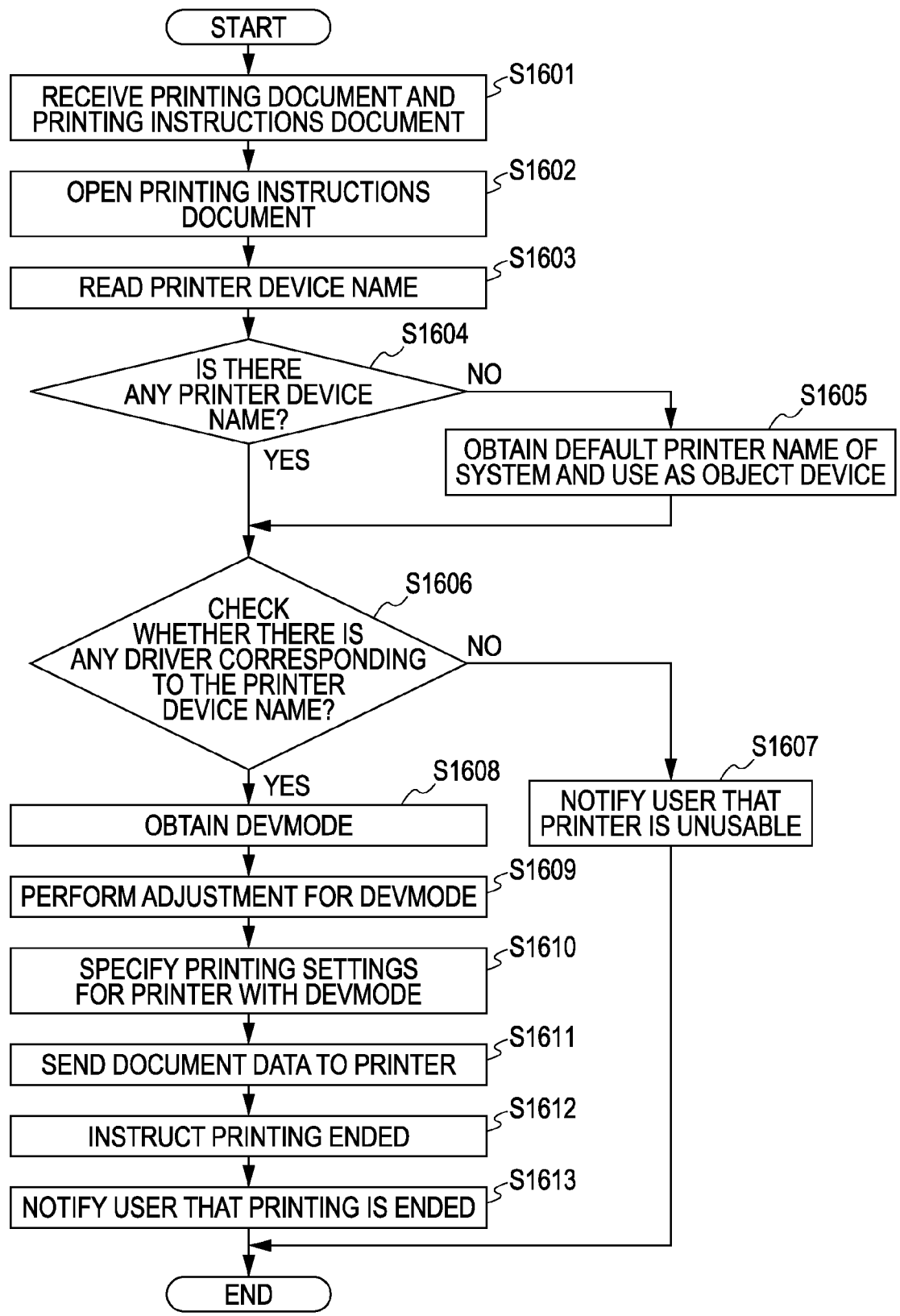

FIG. 17

| | |
|---|---|
| PRINTER DEVICE NAME | 1701 |
| PRINTING DOCUMENT NAME | 1702 |
| PAGE PLACEMENT INFORMATION UNIT | 1703 |
| PRINTER INSTRUCTION UNIT | 1704 |

FIG. 18

| | | |
|---|---|---|
| PAGE LAYOUT | TWO PAGES PER SHEET | 1801 |
| PLACEMENT ORDER | LEFT TO RIGHT | 1802 |
| STAMP | CLASSIFIED | 1803 |
| NUMBER OF COPIES | 1 | 1804 |
| BINDING DIRECTION | LEFT SIDE BINDING | 1805 |
| BINDING MARGIN | 5 mm | 1806 |
| WHITE SPACE | 6 mm | 1807 |
| IMPOSITION | SADDLE-STITCH BINDING | 1808 |
| OPENING DIRECTION | OPEN TO LEFT | 1809 |
| PARTS | 15 SHEETS EACH | 1810 |

FIG. 19

| SHEET OUTPUT METHOD | STAPLE | ~1901 |
|---|---|---|
| PRINTING METHOD | DUPLEX PRINTING | ~1902 |
| SHEET SUPPLY METHOD | CASSETTE 1 | ~1903 |
| RESOLUTION | FINE | ~1904 |

FIG. 20

| PRINTER NAME | Color MFP | ~2001 |
|---|---|---|
| DEVMODE SIZE | 200 Bytes | ~2002 |
| SHEET | A4 | ~2003 |
| SHEET DIRECTION | PORTRAIT | ~2004 |
| COLOR MODE | COLOR | ~2005 |
| PAGE LAYOUT | 2 PAGES PER SHEET | ~2006 |
| BINDING DIRECTION | LEFT SIDE BINDING | ~2007 |
| BINDING MARGIN | 5 mm | ~2008 |
| PRINTING METHOD | DUPLEX PRINTING | ~2009 |
| SHEET OUTPUT METHOD | STAPLE | ~2010 |
| NUMBER OF COPIES | 1 | ~2011 |

FIG. 29

<PRODUCT: SADDLE-STITCH BINDING>
   SHEET USED FOR PRINTING: A3
   FINISHED SIZE: A4 (PORTRAIT)
   BINDING FINISHING: YES (SADDLE-STITCH STAPLING BY INLINE FINISHER)
   OPENING DIRECTION: OPEN TO LEFT
   PART SPECIFICATION: DIVIDE INTO BOOKS FORMED OF 15 SHEETS
   DEVICE USED: MFP-1 (NON-CORRESPONDING DEVICE)

FIG. 30

| | | |
|---|---|---|
| PAGE LAYOUT | 1 PAGE PER SHEET | ~3001 |
| PLACEMENT ORDER | LEFT TO RIGHT | ~3002 |
| STAMP | CLASSIFIED | ~3003 |
| NUMBER OF COPIES | 1 | ~3004 |
| BINDING DIRECTION | OFF* | ~3005 |
| BINDING MARGIN | 5 mm | ~3006 |
| WHITE SPACE | 6 mm | ~3007 |
| IMPOSITION | SADDLE-STITCH BINDING* | ~3008 |
| OPENING DIRECTION | OPEN TO LEFT* | ~3009 |
| PARTS | 15 SHEETS EACH* | ~3010 |

FIG. 31

| PAGE LAYOUT | 1 PAGE PER SHEET | ~3101 |
|---|---|---|
| PLACEMENT ORDER | LEFT TO RIGHT | ~3102 |
| STAMP | CLASSIFIED | ~3103 |
| NUMBER OF COPIES | 1 | ~3104 |
| BINDING DIRECTION | LEFT-SIDE BINDING * | ~3105 |
| BINDING MARGIN | 5 mm | ~3106 |
| WHITE SPACE | 6 mm | ~3107 |
| IMPOSITION | 1×1* | ~3108 |
| OPENING DIRECTION | OFF* | ~3109 |
| PARTS | OFF* | ~3110 |

FIG. 32

| SHEET OUTPUT METHOD | SADDLE-STITCH STAPLING * | ~3201 |
|---|---|---|
| PRINTING METHOD | DUPLEX PRINTING | ~3202 |
| SHEET SUPPLY METHOD | CASSETTE 1 | ~3203 |
| RESOLUTION | FINE | ~3204 |

FIG. 33

| | | |
|---|---|---|
| SHEET OUTPUT METHOD | OFF* | ~3301 |
| PRINTING METHOD | DUPLEX PRINTING | ~3302 |
| SHEET SUPPLY METHOD | CASSETTE 1 | ~3303 |
| RESOLUTION | FINE | ~3304 |

FIG. 34

| | | |
|---|---|---|
| PRINTER NAME | Color MFP | ~3401 |
| DEVMODE SIZE | 200 Bytes | ~3402 |
| SHEET SIZE | A3 | ~3403 |
| SHEET DIRECTION | LANDSCAPE | ~3404 |
| COLOR MODE | COLOR | ~3405 |
| PAGE LAYOUT | ONE PAGE PER SHEET | ~3406 |
| BINDING DIRECTION | LEFT-SIDE BINDING | ~3407 |
| BINDING MARGIN | 5 mm | ~3408 |
| PRINTING METHOD | DUPLEX PRINTING | ~3409 |
| SHEET OUTPUT METHOD | SADDLE-STITCH STAPLING * | ~3410 |
| NUMBER OF COPIES | 1 | ~3411 |

FIG. 35

| PRINTER NAME | Color MFP | 3501 |
|---|---|---|
| DEVMODE SIZE | 200 Bytes | 3502 |
| SHEET SIZE | A3 | 3503 |
| SHEET DIRECTION | LANDSCAPE | 3504 |
| COLOR MODE | COLOR | 3505 |
| PAGE LAYOUT | ONE PAGE PER SHEET | 3506 |
| BINDING DIRECTION | LEFT-SIDE BINDING | 3507 |
| BINDING MARGIN | 5 mm | 3508 |
| PRINTING METHOD | DUPLEX PRINTING | 3509 |
| SHEET OUTPUT METHOD | OFF* | 3510 |
| NUMBER OF COPIES | 1 | 3511 |

INFORMATION PROCESSING APPARATUS AND CONTROL METHOD, AND CONTROL PROGRAM

BACKGROUND OF THE INVENTION

1. Field of the Invention

The present invention relates to an information processing apparatus which provides printing setting functions as to document data generated by a document process program, for example, and the method thereof.

2. Description of the Related Art

When working with different data types, such as text, charts, images, the configurations defining such data or the editing operations as to such data differ, and accordingly various application programs according to the type of the various types of data are provided. Accordingly, a user may be required to use different applications for each type of data such as a text processing program to edit text, a spreadsheet program to edit charts, and an image editing program to edit images.

Thus, generally the user uses an application program corresponding to the type of data. However, rather than documents configured with one type of data such as text only, charts only, or images only, documents handled are generally configured with multiple types of data such as text and charts, or text and images. Thus, in order to create document including multiple types of data, the user needs to use printing function provided by each application, employ each application to print each data type, and combine the printed material manually in a desired sequence to create the desired document.

Alternatively, according to a program forming one integrated application from various types of applications, called an office suite for example, a function is provided to combine data generated with various applications to configure one document. By using the integrated application, the user can aggregate the data created with various applications into one document by the specific application included in the integrated application (Japanese Patent Laid-Open No. 2007-58563).

Also, Japanese Patent Laid-Open No. 2005-174226 discloses a technique wherein, in order to resolve printing setting conflicts, the item generated by the conflict and an item without conflict are identifiably displayed.

With such an integrated application according to the related art, data editing, placement, and even setting printing specifying settings, can be performed while confirming with a preview display or the like, without needing to actually print the document combined into one document.

However, with currently-used integrated applications, in the case that a printer is selected which does not correspond to the integrated application, the integrated application has no way to correctly obtain and control all of the function information of the printer. Therefore, the integrated application may not be able to issue print instructions for functions the integrated application cannot obtain or cannot control.

Accordingly, in the case that a printer is selected which does not correspond to the integrated application, the integrated application may not instruct all of the functions as to the non-corresponding printer. Therefore, for functions which cannot be specified by the integrated application, the user may need to open a printer driver setting screen and perform settings, reducing ease of operation for the user.

Also, in the case that the setting items set by the user via the setting screen of the printer driver and the setting items set by using the integrated application are duplications, the output results may have problems. For example, in the case that binding printing is set in both of the integrated application and printer driver, both execute imposition processing for binding printing, so the user may not obtain the desired printing results.

That is to say, in the case that the printer which the user selected to use is a printer which does not correspond to the integrated application, not only does this cause additional work, but also settings operations for obtaining printed material similar to the preview display with the integrated application may be difficult.

SUMMARY OF THE INVENTION

An embodiment of the present invention is provided for enabling obtaining printed material similar to the preview display with the integrated application in a case also when using a printer which does not correspond to the integrated application.

An embodiment of the present invention is provided for determining, in order to obtain printing results desired by a user, according to the selected printing apparatus, printing setting items to be set using a printer driver and printing setting items to be set employing the integrated application.

To this end, the information processing apparatus according to an embodiment of the present invention is capable of communicating with a printing apparatus, and having an application which sets printing setting information for a document to be printed, wherein the application works with printer driver, and includes: a first determining unit arranged to determine whether or not predetermined printing setting information to be set using the printer driver is included in the printing setting information set using the application based on attribute of selected printing apparatus and printing setting information set using the application; and a display control unit arranged to display information relating to printing setting information to be set using the printer driver of the selected printing apparatus in a case the first determining unit determines that the printing setting information to be set using the printer driver is included in the printing setting information set using the application.

Further, the information processing apparatus according to an embodiment of the present invention is capable of communicating with a printing apparatus, and having an application which sets printing setting information for a document to be printed, wherein the application works with printer driver, the information processing apparatus comprising, and includes: a selecting unit arranged to select a printing apparatus to be used for printing; and a determining unit for determining printing setting item to be set using the application and printing setting item to be set using the printer driver, based on the attributes of the printing apparatus selected by the selecting unit.

Further features of the present invention will become apparent from the following description of exemplary embodiments with reference to the attached drawings.

BRIEF DESCRIPTION OF THE DRAWINGS

FIG. 4 is a diagram illustrating an example of book attributes according to the present embodiment.

FIG. 5 is a diagram illustrating an example of chapter attributes according to the present embodiment.

FIG. 6 is a diagram illustrating an example of page attributes according to the present embodiment.

FIG. 14 is a diagram illustrating an example of data configuration of a document file according to the present embodiment.

FIG. 15 is a diagram illustrating a data configuration example of detailed document settings information according to the present embodiment.

FIG. 16 is a flowchart illustrating an output sequence for a document processing system according to the present embodiment.

FIG. 17 is a diagram illustrating a configuration example of a printing instruction document according to the present embodiment.

FIG. 18 is a diagram illustrating detailed content of a printing instruction document according to the present embodiment.

FIG. 19 is a diagram illustrating detailed content of a printing instruction document according to the present embodiment.

FIG. 20 is a diagram illustrating content of DEVMODE, according to the present embodiment.

FIG. 29 is an example of a work instruction document according to the present embodiment.

FIG. 30 is a diagram illustrating detailed content of a printing instruction document according to the present embodiment.

FIG. 31 is a diagram illustrating detailed content of a printing instruction document according to the present embodiment.

FIG. 32 is a diagram illustrating detailed content of a printing instruction document according to the present embodiment.

FIG. 33 is a diagram illustrating detailed content of a printing instruction document according to the present embodiment.

FIG. 34 is a diagram illustrating DEVMODE content according to the present embodiment.

FIG. 35 is a diagram illustrating DEVMODE content according to the present embodiment.

DESCRIPTION OF THE EMBODIMENTS

The preferred embodiments of the present invention will be described in detail below with reference to the appended drawings. Note that the embodiments described below do not limit the scope of the present invention, and also all of the combinations of the features described with the embodiments are not necessary for the solutions of the present invention.

Overview of Document Processing System According to Present Embodiment

The overview of a document processing system according to a first embodiment of the present invention will be described with reference to FIGS. 1 through 12. With this document processing system, a data file created with a general application is converted to an electronic document file with an electronic document writer. A binding application provides the function to edit such electronic document file. The details thereof will be described below.

<System Configuration and Operation>

Figure 1:
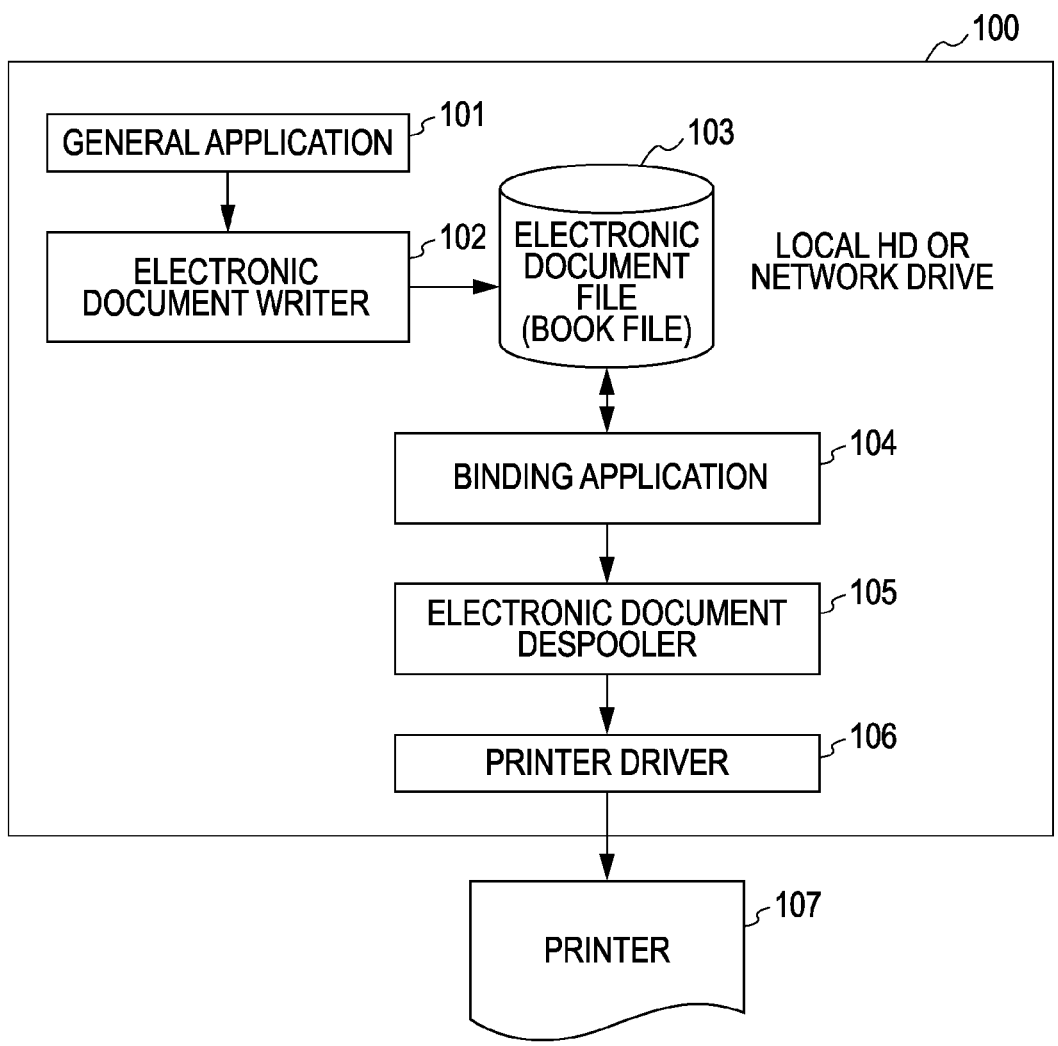
FIG. 1 is a block diagram to describe a configuration of a stand-alone type document processing system according to an embodiment of the present invention.

FIG. 1 is a diagram illustrating a software configuration of a document processing system applicable to the information processing system according to an embodiment of the present invention.

The document processing system is realized by a digital computer 100 which is a preferred embodiment of the information processing system according to the present embodiment. A general application 101 is an application program providing functions such as word processing and spreadsheets, photo retouch, draw or paint, presentations, text editing and so forth, and has a printing function. These application programs use a predetermined interface provided by an operating system (OS) when printing application data such as created document data or image data. That is to say, in order to print the created data, the application 101 sends an output command (GDI function) in a format dependent on the OS which has been defined beforehand as to the output module of the OS providing the interface. The output module receiving the output command converts the command to a format which the output device such as printer can process, and outputs the converted command (DDI function). The format which the output device can process differs according to the type of device, make, or model thereof. Therefore, a device driver is provided for each device, and the OS generates the printing data by using the device driver to convert the command, and generates the print job by spooling with the JL (Job Language). In the case of using Windows (registered trademark) by Microsoft Corporation for example as the OS, a module called a GDI (Graphic Device Interface) is equivalent to the above-described output module.

An electronic document writer 102 is an improvement on the above-describe device driver, and is a software module provided to realize the document processing system. However, the electronic document writer 102 is not a specified output device itself, but generates an electronic document file 103 by converting an output command in a format which can be processed by a binding application 104 or printer driver 106 to be described later. The format after conversion by the electronic document writer 102 (hereafter called "electronic document format") can be any format as long as the document in page increments can be expressed in a detailed writing format. Of an actual standard format, a PDF format by Adobe Systems or DGML format or the like can be employed as the electronic data format. In the case of using the electronic document writer 102 with the application 101, printing is executed after specifying the electronic document writer 102 as the device driver to use for output. However, with an electronic document file simply as created by the electronic document writer 102, the format thereof is not complete as an electronic document file. Therefore, the binding application 104 specifies the electronic writer 102 as the device driver, and under the management thereof the application data is converted to the electronic document file. The binding application 104 completes the new incomplete electronic document file created by the electronic writer 102 as an electronic document file having the format to be described later. Hereafter, in the event it is necessary to clearly distinguish this point, the file created by the electronic document writer 102 is called the "electronic document file", and the electronic document file configured by the binding application 104 is called a "book file". Also, in the case that distinguishing is not necessary, document files generated by the application, electronic document files, and book files are each called "document file".

The electronic document writer 102 is thus specified as the device driver, and the application data is printed with the general application 101. Consequently, the application data (document) is converted into an electronic document format having the pages defined by the application 101 (hereafter called "logical page" or "document page"), and is stored in a storage medium such as a hard disk as an electronic document file 103. Note that the hard disk may be a local drive on a computer which realized the document processing system according to the present embodiment, or may be a drive provided on a network in the case of being connected to a network.

The binding application 104 reads the "electronic document file" or "book file" 103, and provides the functions for editing to the user. However, the binding application 104 does not provide functions for editing the content of each page, but provides functions to edit the configuration of the later-described chapters or books configured with the page as the smallest unit.

In the event of printing the book file 103 edited by the binding application 104, an electronic document despooler 105 is started by the binding application 104. The electronic document despooler 105 reads the specified book file from the hard disk, generates the output command applicable to the above-described output module of the OS in order to print each page in the format described in the book file, and outputs to an unshown output module. In this event, the printer driver 106 for a printer 107 used as the output device is specified as the device driver thereof. The output module uses the specified printer driver 106 of the printer to convert the received output command to a device command which can be understood and executed by the printer 107. This device command is sent to the printer 107, and the image according to such command is printed by the printer 107. Note that the information processing apparatus 100 and printer 107 are communicably connected.

Figure 2:
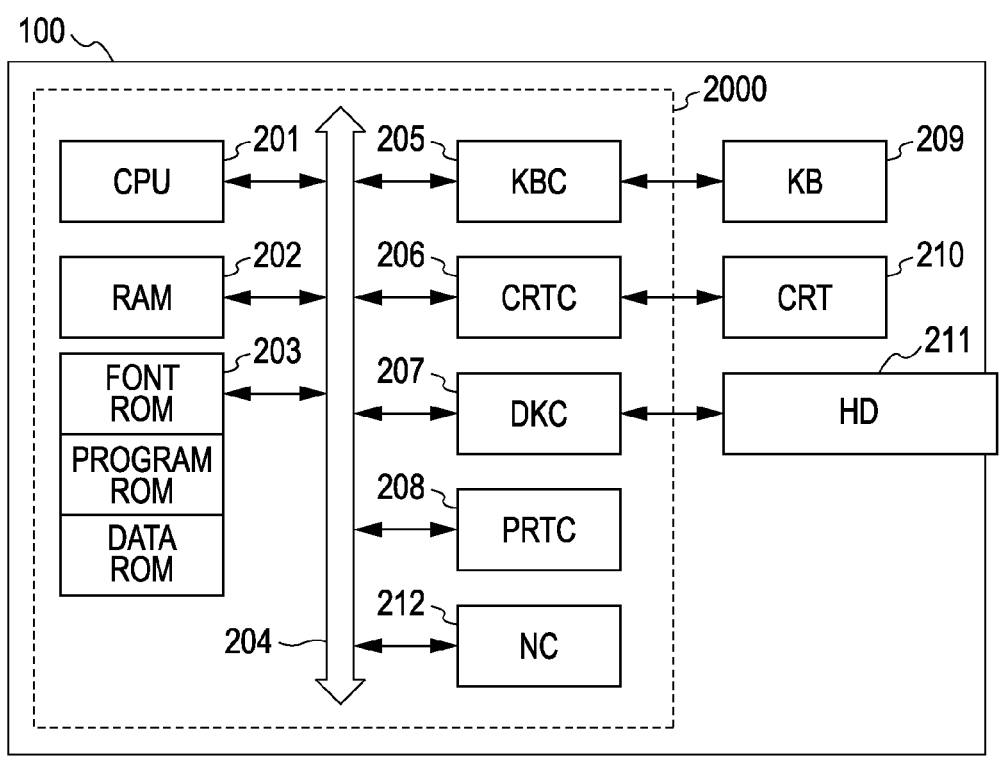
FIG. 2 is a block diagram illustrating a configuration of a host computer of the document processing system according to the present embodiment.

FIG. 2 is a block diagram illustrating the hardware configuration of the digital computer 100 shown in FIG. 1. In FIG. 2, a CPU 201 executes an OS stored in the program ROM of the ROM 203 or loaded in the RAM 202 from the hard disk 211, or programs such as the general application 101 or binding application 104. That is to say, the CPU 201 realizes the software configuration in FIG. 1 or sequences of a later-described flowchart. The RAM 202 functions as the primary memory, work area, and so forth of the CPU 201. A keyboard controller (KBC) 205 controls key input from a keyboard 209 or an unshown pointing device. A CRT controller (CRTC) 206 controls display of a display unit 210. Note that the display unit 210 is not limited to a CRT, and may be liquid crystal or plasma, for example. A disk controller (DKC) 207 controls access between a boot program, various applications, font data, user files, hard disk (HD) 211 and unshown floppy (registered trademark) disk (FD) and so forth. A PRTC 208 controls signal conversion between the connected printer 107. An NC 212 is connected to a network 204, and executes the communication control processing with other apparatuses connected to the network 204.

<Electronic Document Data Format>

Before describing the details of the editing application 104, the data format of the above-described "book file" will be described.

The book file has a layered configuration with three layers which emulate a book having a paper medium. The upper layer is called a "book", and emulates one physical book, and the attributes according to the entire book are defined therein. The middle layer thereunder equates to a chapter in a book, and is also called a "chapter". The attributes for each chapter are defined for each "chapter". The bottom layer is a "page", and equates to each page defined with the application program. The attributes for each page are also defined for each "page". Note that one "book" may include multiple "chapters", and one "chapter" may include multiple "pages".

Figure 3A:
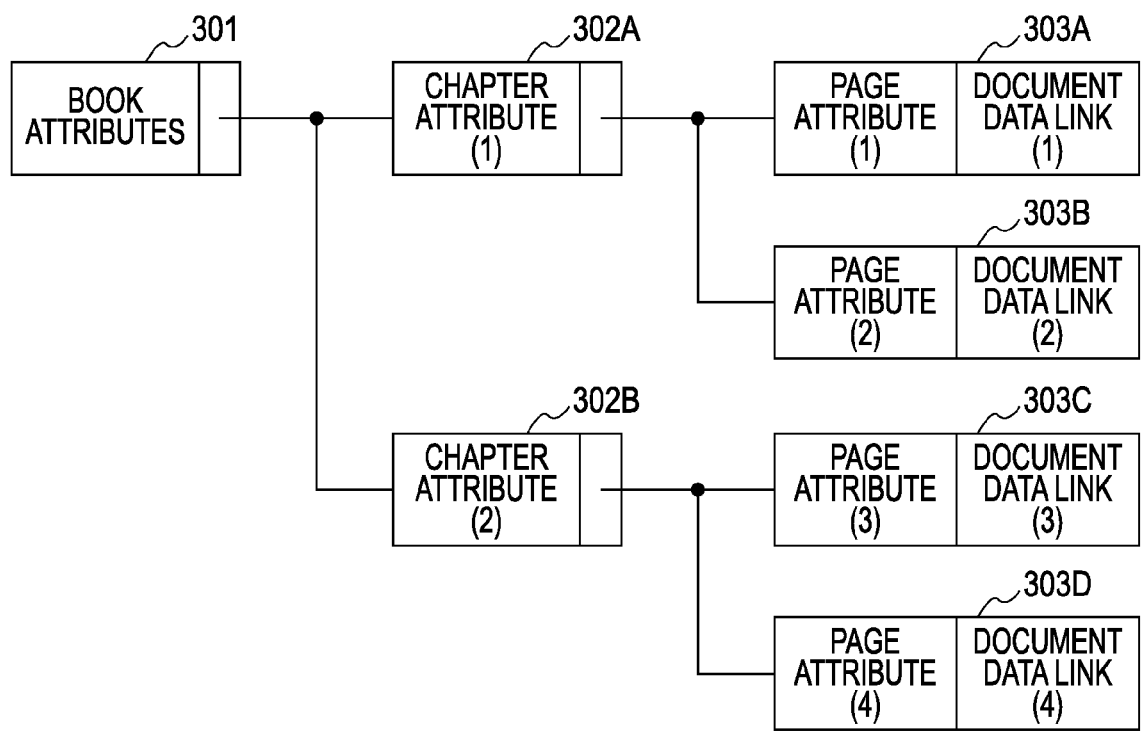
FIG. 3A is a diagram schematically illustrating an example of a book file format.
Figure 3B:
FIG. 3B is a diagram illustrating a configuration of the document data.

FIG. 3A is a diagram schematically illustrating an example of the book file format. The "book", "chapter", and "page" in the book file in this example are indicated by nodes equating to each. One book file includes one "book". "Book" and "chapter" are concepts for defining the configuration of a "book", so include the defined attribute values thereof and links to the lower levels as a material entity thereof. "Page" has the data for each "page" output by the application program as a material entity thereof. Therefore the "page" includes the attribute values thereof, as well as the material document pages (document page data) and links to each document page data. Note that there may be cases wherein the printing page in the event of outputting to a paper medium or the like include multiple document pages. With this configuration, the attributes for each layer of "book", "chapter", and "page" are displayed rather than the links being displayed.

In FIG. 3A, a book 301 has book attributes defined, and also two chapters 302A and 302B are linked. With these links, the fact that chapters 302A and chapter 302B are included in the book 301 is displayed. Further, page 303A and 303B are linked to chapter 302A, showing that these pages are included. Each page 303A and 303B have the attribute values of each page defined, and links to the document page data (1) and (2) which are the material entity thereof are included. These links specify the document data (1) and (2) of the document page data 304 shown in FIG. 3B, and displays that the material entity of the pages 303A and 303B are the document page data (1) and (2).

Similarly, pages 303C and 303D are included in the chapter 302B, and links to the document page data (3) and (4) which are the material entity thereof are included. These links specify the document data (3) and (4) of the document page data 304 shown in FIG. 3B, and displays that the material entity of the pages 303C and 303D are the document page data (3) and (4).

FIG. 4 is a diagram for describing the book attribute 301 according to the present embodiment. Now, for items which are definable duplicated with a lower layer, the attribute values of the lower layer are employed with priority. Therefore, for the items only included in the book attribute 301, the value defined in the book attribute 301 becomes the valid value throughout the entire book. However, the items duplicated with the lower layer serve as the default values in the case that these are not defined in the lower layer. Note that each item shown in the diagram do not correspond specifically to one item, but may also include multiple related items.

FIG. 5 is a diagram describing chapter attributes according to the present embodiment, and FIG. 6 is a diagram describing page attributes according to the present embodiment. The relation between the chapter attributes and page attributes are also similar to the relation between the above-described book attributes and lower level attributes.

In FIG. 4, the items unique to the book attributes 301 are the six items of "printing method", "binding details", "cover/back cover", "index sheet", "facing sheet", and "chapter break". These items are items defined throughout the book.

As attributes for "printing method", three values of "simplex printing", "duplex printing", and "binding printing" can be specified. "Binding printing" here is a method for folding in half the number of sheets to be specified separately and binding the bundle thereof to print in a format wherein a bound book can be formed. In the case that attributes for "binding details" are specified as "binding printing" for "printing method", specifications can be made such as "opening direction" or "number of sheets in bundle" or the like.

The attributes for "cover/back cover" include specifications to add a sheet serving as a cover and back cover, and specifications of printing content to the added sheets. The attributes for "index sheet" include specifications of inserting an index sheet with separately prepared tabs in the printing apparatus and specifications of printing content of the index (tab) portion, as chapter breaks. These attributes are valid in the case that the inserter having a insert function to insert a sheet separately prepared from the printing sheet into a desired position is provided on the printing apparatus to be used, or in the case that multiple paper supply cassettes can be used. This is the same in the case of "facing sheet" attributes also. The attributes for "facing sheet" include specifications for inserting a sheet supplied from an inserter or supply cassette to serve as a chapter break, and specifications for the sheet supply source in the case of inserting a facing sheet.

The attributes for "chapter break" includes specifications as to whether a new sheet is used for the chapter break, a new printing page is used, or nothing is specifically done. In the case of "simplex printing", this has the same meaning as using a new sheet and using a new printing page. In the case of "duplex printing", if "use new sheet" is specified continuing chapters are not printed on one sheet, but if "use new printing page" is specified continuing chapters may be printed on the front and back of one sheet.

Next, regarding the chapter attributes shown in FIG. 5, there are no items unique to a chapter, but all are duplicated with the book attributes. Accordingly, if the definition for chapter attributes and the definition for book attributes differ, the value defined with chapter attributes has priority. Items sharing only the above-described book attributes and chapter attributes are the five items of "sheet size", "sheet direction" "N-UP printing specification", "enlarge/reduce", and "sheet output method". Of these, the "N-UP printing specification" attribute is an item for specifying the number of original pages included in a single printing page. Examples of placements which can be specified here include 1×1, 1×2, 2×2, 3×3, 4×4, and so forth. The "sheet output method" attribute is an item for specifying whether or not to staple output sheets, and the validity of this attribute depends on whether or not the printing apparatus has stapling functions or not.

Next with the page attributes shown in FIG. 6, the items unique to page attributes include "specify page rotation", "zoom", "specify placement", "annotation", "page division", and so forth. "Specify page rotation" is an item to specify the rotation angle in the event of placing a document page on a printing page. The attributes for "zoom" is an item for specifying the magnification of the document page. The magnification is specified as the size of the virtual logical region as 100%. The virtual logical page region is a region which one document page occupies in the case that the document page is placed according to specifications by N-UP and so forth. For example in the case of 1×1, the virtual logical page region is a region equating to one printed page, and in the case of 1×2, the region becomes reduced to 70% of each edge of one printed page.

As shared attributes of each of "book", "chapter", and "page", there are "watermark" attributes and "header/footer" attributes. A "watermark" is an image or text string separately specified which is printed layered with data created with the application. A "header/footer" is a watermark printed on the upper white space and lower white space of each page. However, the "header/footer" has items which can be specified by variables such as page numbers or day/time. Note that content which can be specified with the attributes for "watermark" and the attributes for "header/footer" are shared between "chapter" and "page", but differ in the case of "book". With a "book", the content of "watermark" and "header/footer" can be set, and also, how to print the "watermark" and "header/footer" throughout the entire book can be set. On the other hand, with "chapter" or "page", only whether or not the "watermark" and "header/footer" set for the book are to be printed can be set.

<Book File Generating Sequence>

The "book file" which is an electronic document file configured with the above-described binding application 104 has the configuration and content such as described above. Next, the sequence to create a book file with the binding application 104 and electronic document writer 102 will be described. Creating the book file is realized as one step of the book file editing operation by the binding application 104.

Figure 7:
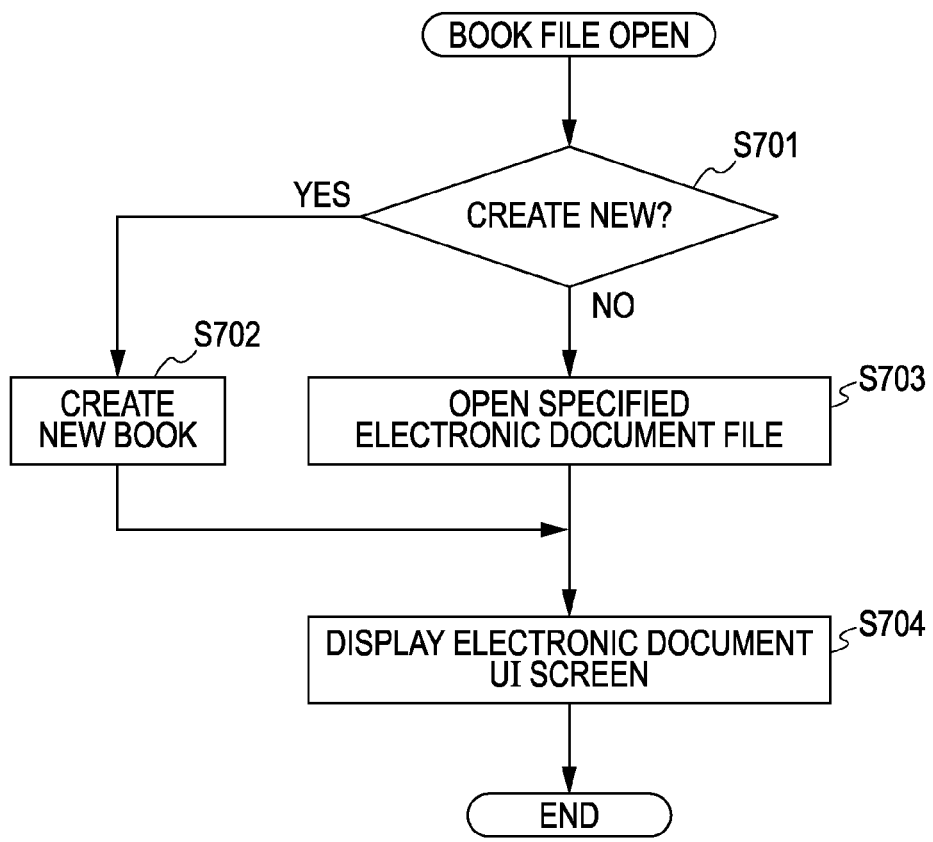
FIG. 7 is a flowchart describing a sequence to open the book file according to the present embodiment.

FIG. 7 is a flowchart describing the sequence to open a book file with the binding application 104 according to the present embodiment.

First, in step S701, determination is made as to whether the book file to be opened is to be newly created or is an existing book. In the case of a new creation, the flow is advanced to step S702, and newly creates a book file not including chapters. The newly created book file only has a book node 301 as shown in the example in FIG. 3, and becomes a book node not having a link as to the chapter node. For the book attributes in this case, a set of attributes prepared beforehand for a new creation is used. The flow is then advanced to step S704, and a user interface (UI) screen for editing a new book file is displayed.

Figure 11:
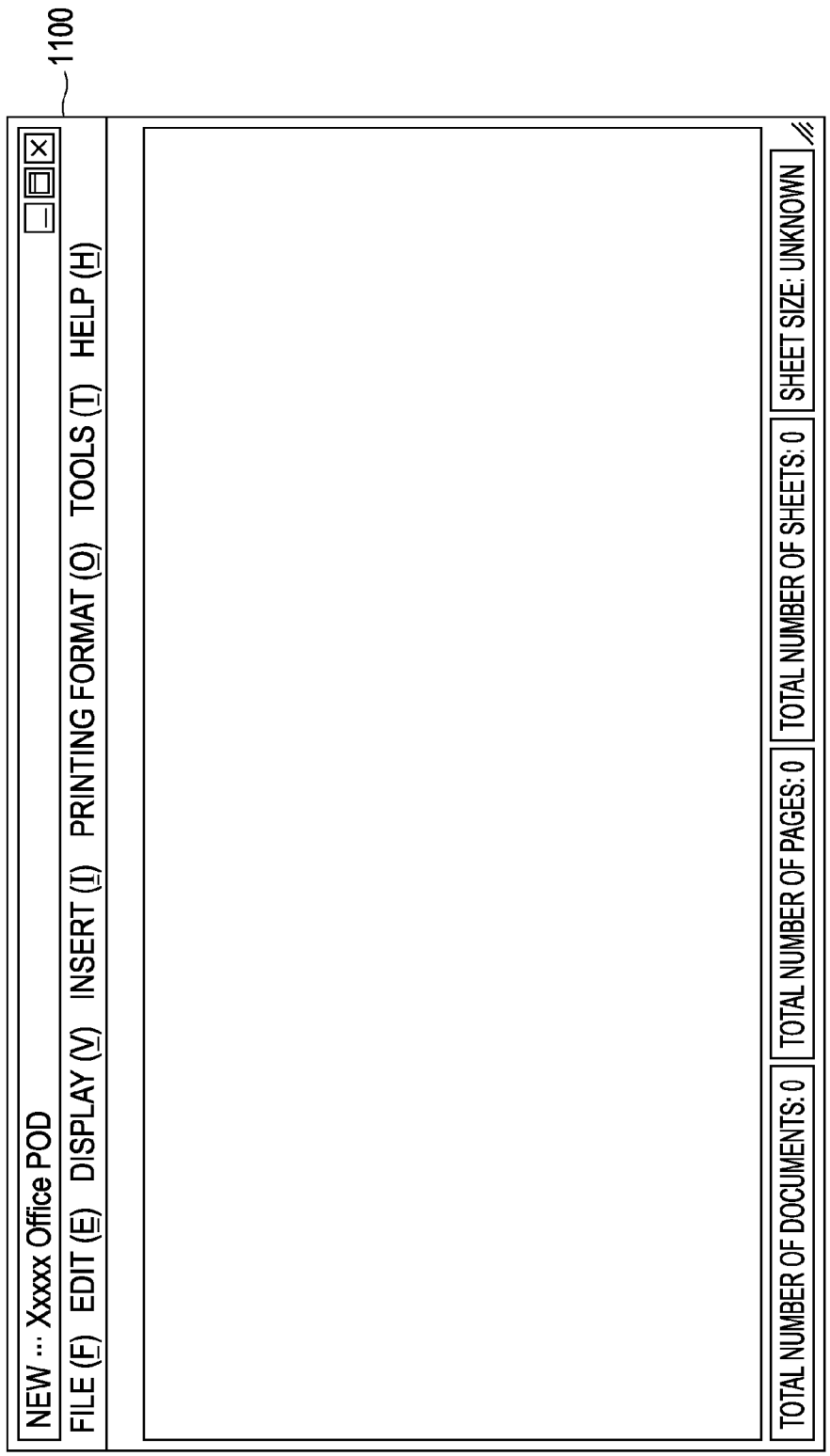
FIG. 11 is a diagram illustrating an example of a user interface screen in the event of opening a new book file.

FIG. 11 is a diagram illustrating an example of a UI screen in the event of opening a new book file. In the illustrated UI screen, since the book file has no actual content, nothing is displayed on a UI screen 1100.

On the other hand, in step S701 if there is an existing book file the flow is advanced to step S703, the specified book file is opened, and the user interface (UI) screen is displayed according to the configuration, attributes, and content of the book file.

Figure 10:
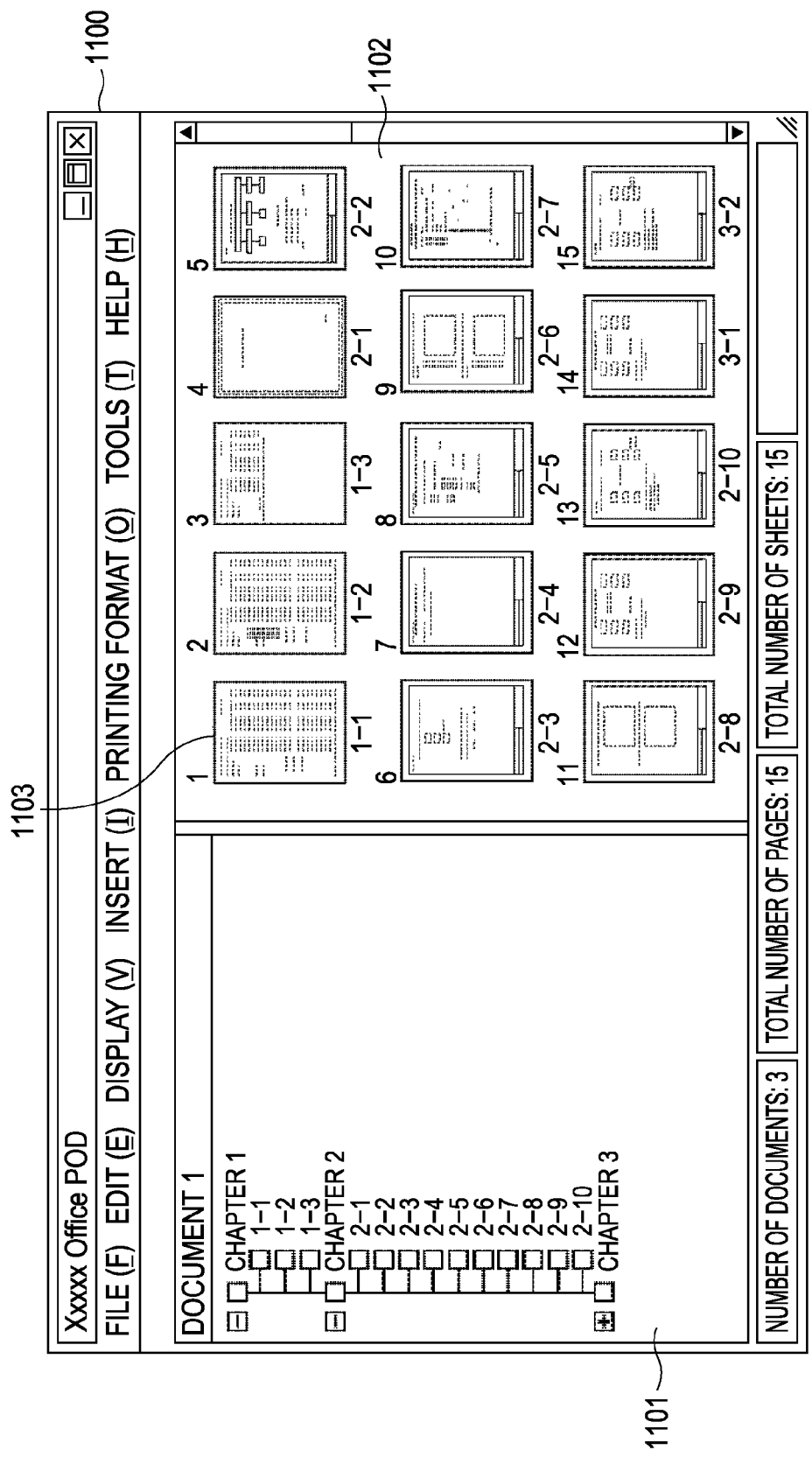
FIG. 10 is a diagram illustrating an example of a user interface screen in the event of opening a known book file.

FIG. 10 is a diagram showing an example of a UI screen in the event of opening an existing book file. The UI screen 1100 includes a tree portion 1101 showing the book configuration and a preview portion 1102 showing the printed state. On the tree portion 1101, the chapters included in the book and pages included in each chapter are displayed in a tree diagram as shown in FIG. 3A. The tree portion 1101 has page numbers displayed thereon, and the page numbers indicate the page numbers of the document pages. Also, on the preview portion 1102, the content of the printed page 1103 is reduced and displayed. The display order reflects the book configuration.

Application data converted to an electronic document file can be added as a new chapter to the opened book file by the electronic document writer 102. This function is called an "electronic document importing function". By electronic document importing into the newly created book file according to the sequence shown in the flowchart in FIG. 7, the material entity of the book file can be seen. This function is started by drag-and-drop operations of the application data with the screen in FIG. 10.

Figure 8:
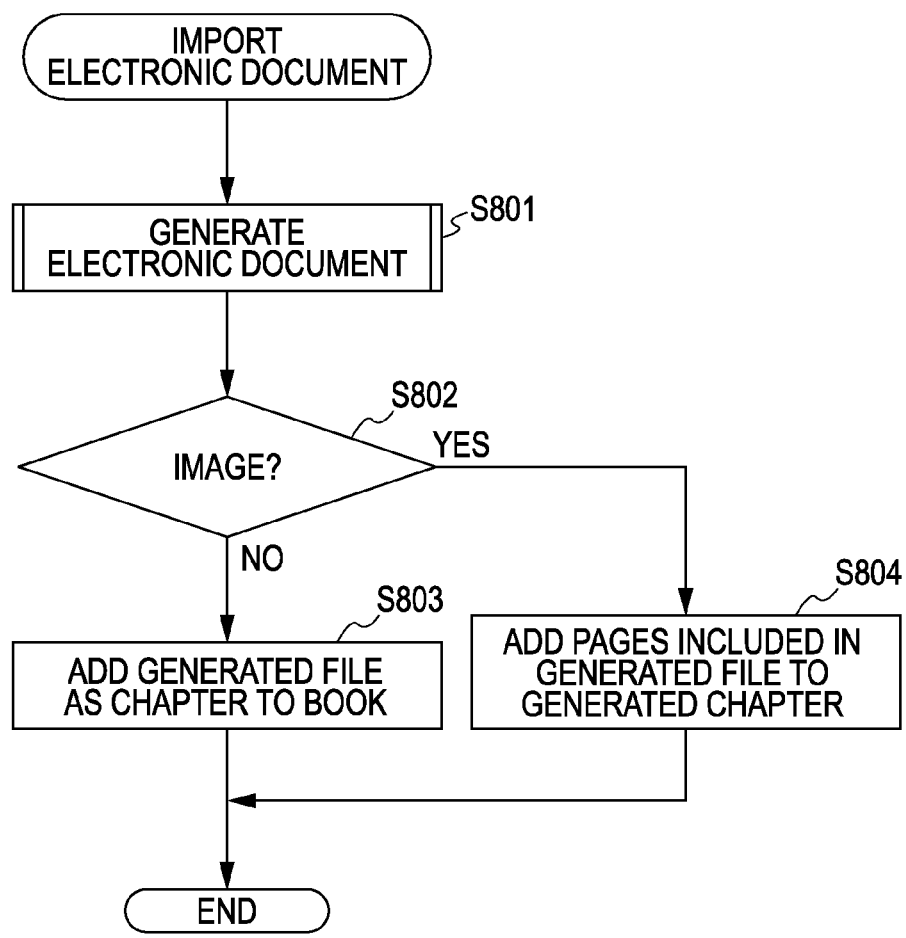
FIG. 8 is a flowchart describing a sequence to import an electronic document file into a book file according to the present embodiment.

FIG. 8 is a flowchart showing the sequence of electronic document importing according to the present embodiment.

First, the application program generating the specified application data is started, and the electronic document writer 102 is specified as the device driver to print the application data, whereby the application data is converted to electronic document data (step S801). Upon ending converting to the electronic document data the flow is advanced to step S802, and determination is made as to whether the converted data is image data. This determination can be made based on the file extension of the application data if using a Windows OS. For example, determinations can be made wherein, if the extension is "bmp" the data is Windows bit map data, and if "jpg", the data is image data compressed with JPEG, and if "tiff", the data is image data in tiff format. Also, since the electronic document file can be directly generated from the image data without starting the application as in step S801 in the case of such image data, the processing in step S801 may be able to be omitted.

In step S802, in the case that the data is not image data, the flow is advanced to step S803, and the electronic data file generated with step S801 is added as a new chapter to the book of the currently open book file. In this case, for the chapter attributes, the values of book attributes are copied if shared with the book attributes, and otherwise are set to standard values prepared beforehand.

Also, in the case that the data is image data in step S802, the flow proceeds to step S804, and as a rule a new chapter is not added, but the document pages included in the electronic document file generated in step S801 are added. However, if the book file is a newly created file, a new chapter is created, and as pages belonging to such chapter, the pages of the electronic document file are added thereto. For the page attributes, those sharing attributes with the upper layer have attribute values provided, and the attributes defined with the application data that follow to the electronic document file have the values thereof provided. For example, in the case that "N-UP printing setting" is specified with the application data, the attribute values thereof follow. Thus, a new book file is created, or a new chapter is added.

Figure 9:
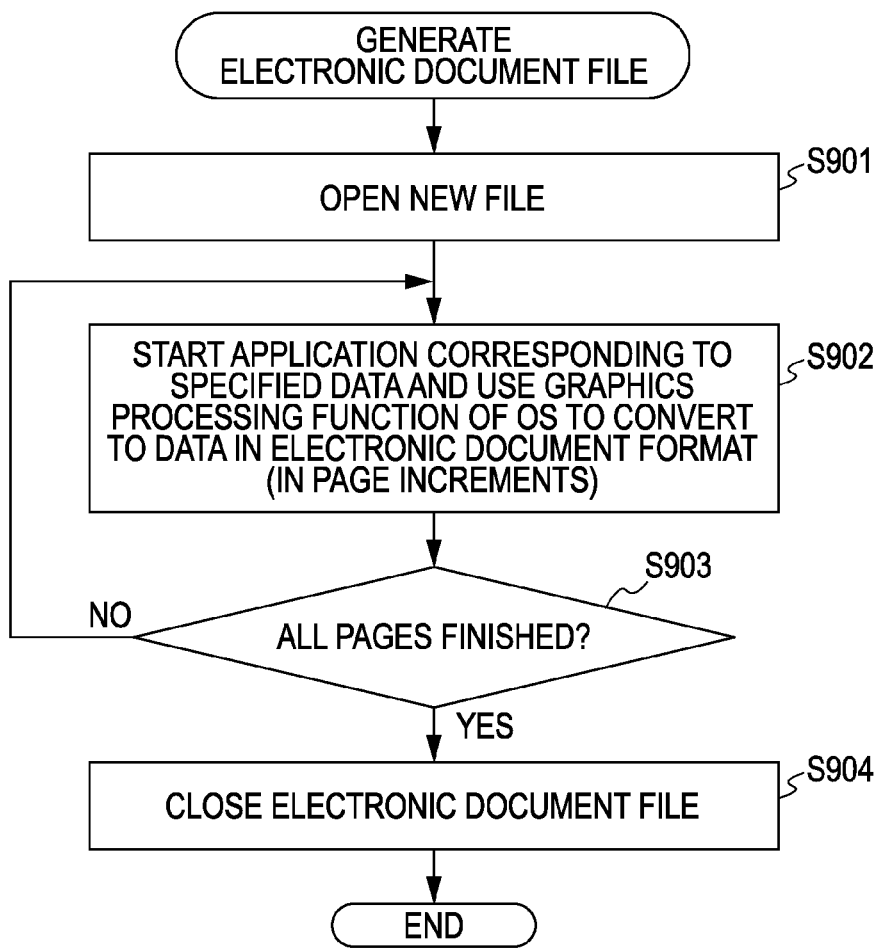
FIG. 9 is a flowchart describing a sequence to convert application data into an electronic document file according to the present embodiment.

FIG. 9 is a flowchart showing the sequence of generating an electronic document file with the electronic document writer 102 in step S801 of FIG. 8.

First in step S901, a new electronic document file is created and opened. Next the flow is advanced to step S902, and an application corresponding to the specified application data is started, and with the electronic document writer 102 serving as the device drivers, an output command is sent to the output module of the OS. The output module converts and the received output command to data of an electronic document format with the electronic document writer and outputs this. The output destination thereof is the electronic document file opened in step S901. Next the flow is advanced to step S903, determination is made as to whether all of the specified data is finished converting, and if finished the flow is advanced to step S904 and the electronic document file is closed. Thus the electronic document file generated with the electronic document writer 102 is a file including the material entity of the document page data shown in FIG. 3B.

<Book File Editing>

Thus, a book file can be created from application data. The following editing operations can be performed as to the chapters and pages of a book file thus generated.

(1) add new
(2) delete
(3) copy
(4) cut
(5) paste
(6) move
(7) change chapter name
(8) renumber pages
(9) insert cover
(10) insert facing sheet
(11) insert index sheet
(12) page layout as to each document page Other than these, an operation to undo an editing operation once performed, or an operation to redo an editing operation subjected to undo can be performed. With these editing functions, for example integrating multiple book files, repositioning chapters or pages within a book file, deleted chapters or pages within a book file, changing the layout of the document pages, inserting a facing sheet or index sheet can be performed. By performing such operation, search results can be reflected in the attributes shown in FIGS. 4 through 6 or reflected in the configuration of the book file. For example, if an operation is performed to add a new blank page, a blank page is inserted in the specified location. This blank page is handled as a document page. Also, by modifying the layout as to the document pages, the modification content is reflected in attributes such as the printing method or N-UP printing, cover/back cover, index sheet, facing sheet, chapter breaks, and so forth.

<Book File Output>

Printing output is the final objective of the book file thus created/edited. When a user selects a file menu from the UI screen 1100 of the binding application shown in FIG. 10 and selects printing therefrom, printing output is performed with the specified output device. In this case, the electronic document despooler 105 generates an OS output command, e.g. a Windows GDI command, from the book file generated from the binding application 104, and sends this to the output module, e.g. the GDI. The output module generates a command applicable to the device by the specified printer driver 106, and sends this to such device.

Figure 23:
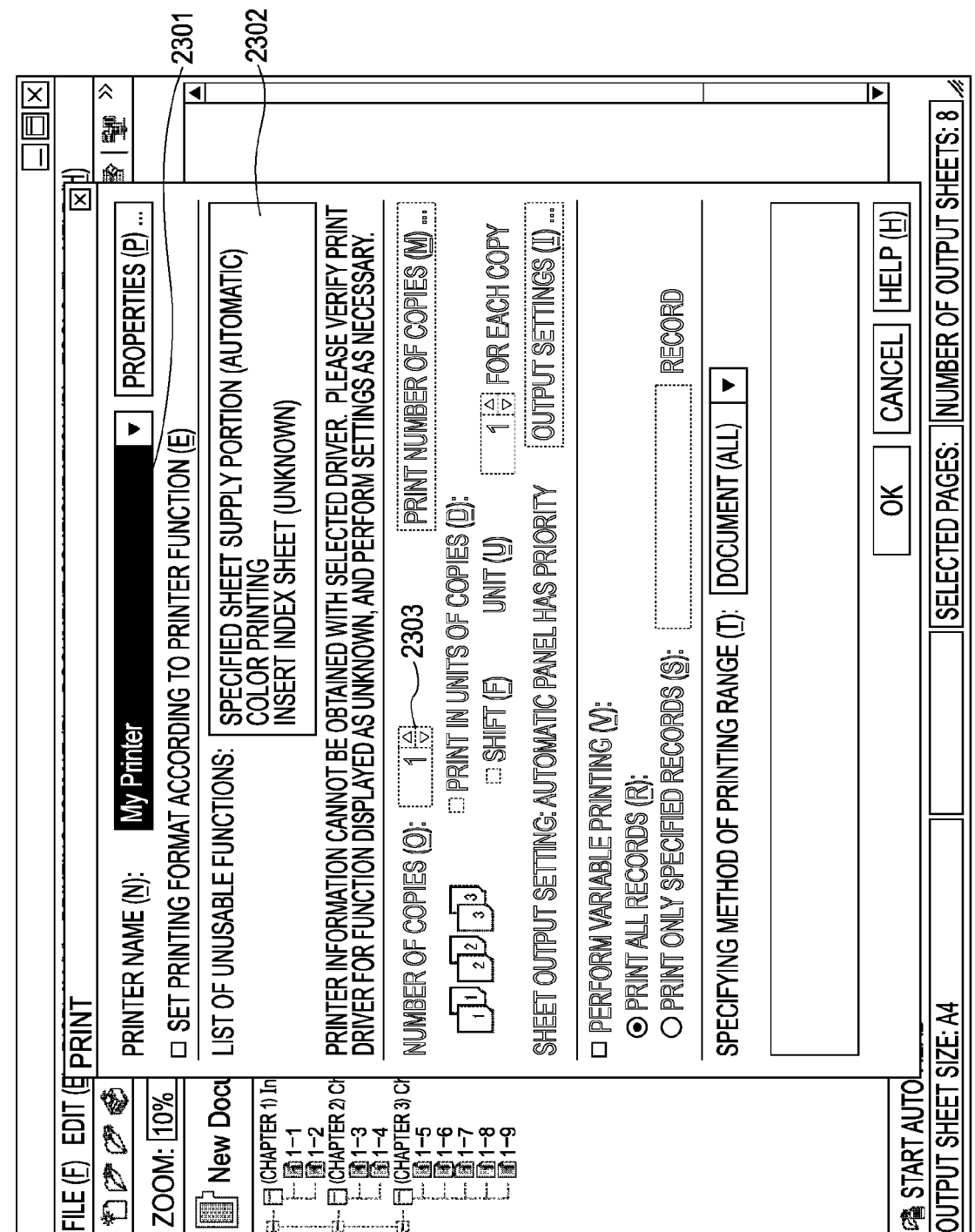
FIG. 23 is a diagram illustrating an example of a user interface screen to execute printing with the document processing system according to the present embodiment.

FIG. 23 is a diagram showing a printing screen of the binding application 104 of the document processing system.

An area 2301 in FIG. 23 is an area to specify a printer used for printing (printer driver), and can be selected from printer drivers registered with the client PC. An area 2303 is an area for specifying the number of copies to be printed.

Figure 28:
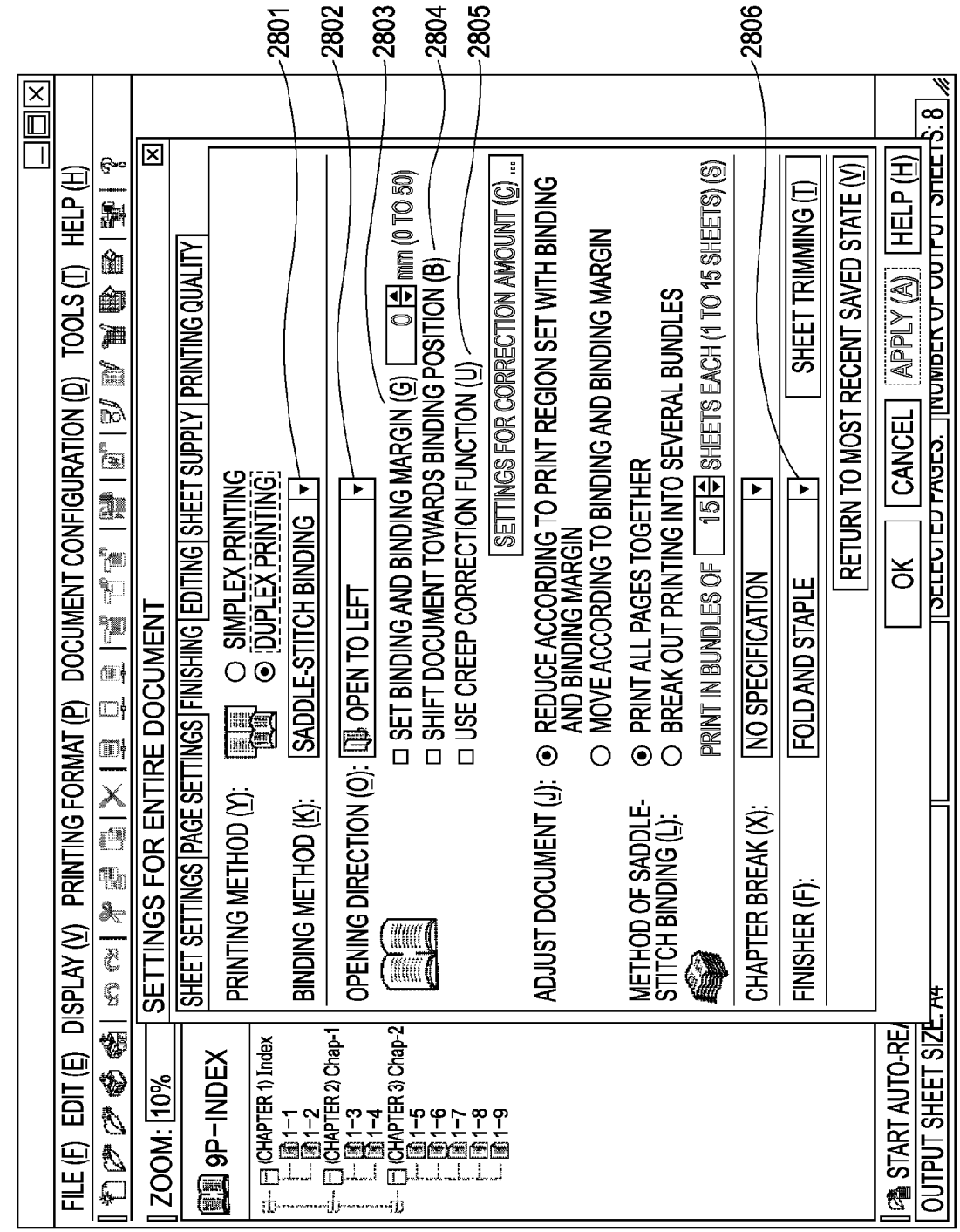
FIG. 28 is a diagram illustrating an example of a user interface screen to perform printing setting with the document processing system according to the present embodiment.

An area 2302 is an area for notification of a function item set with the screen in FIG. 28 of the binding application 104 in the case that the printer selected with area 2301 of the function settings as to the printer has no such function, or cannot instruct such function.

The function notified in area 2302, in the event that printing is executed by pressing the OK button, the binding application 104 temporarily releases the settings, and generates the book file to pass on to the electronic document despooler 105. Thus, the printing instruction document can be changed to print a book file according to the capability of the selected printer. This processing will be described later in detail.

<Other System Configurations>

An overview of the document processing system according to the present embodiment is such as described above. This is a stand-alone type system, but with an expanded server/client system, a book file can be created and edited with similar configurations and sequences. However, the book file or printed processing is managed by the server.

Figure 12:
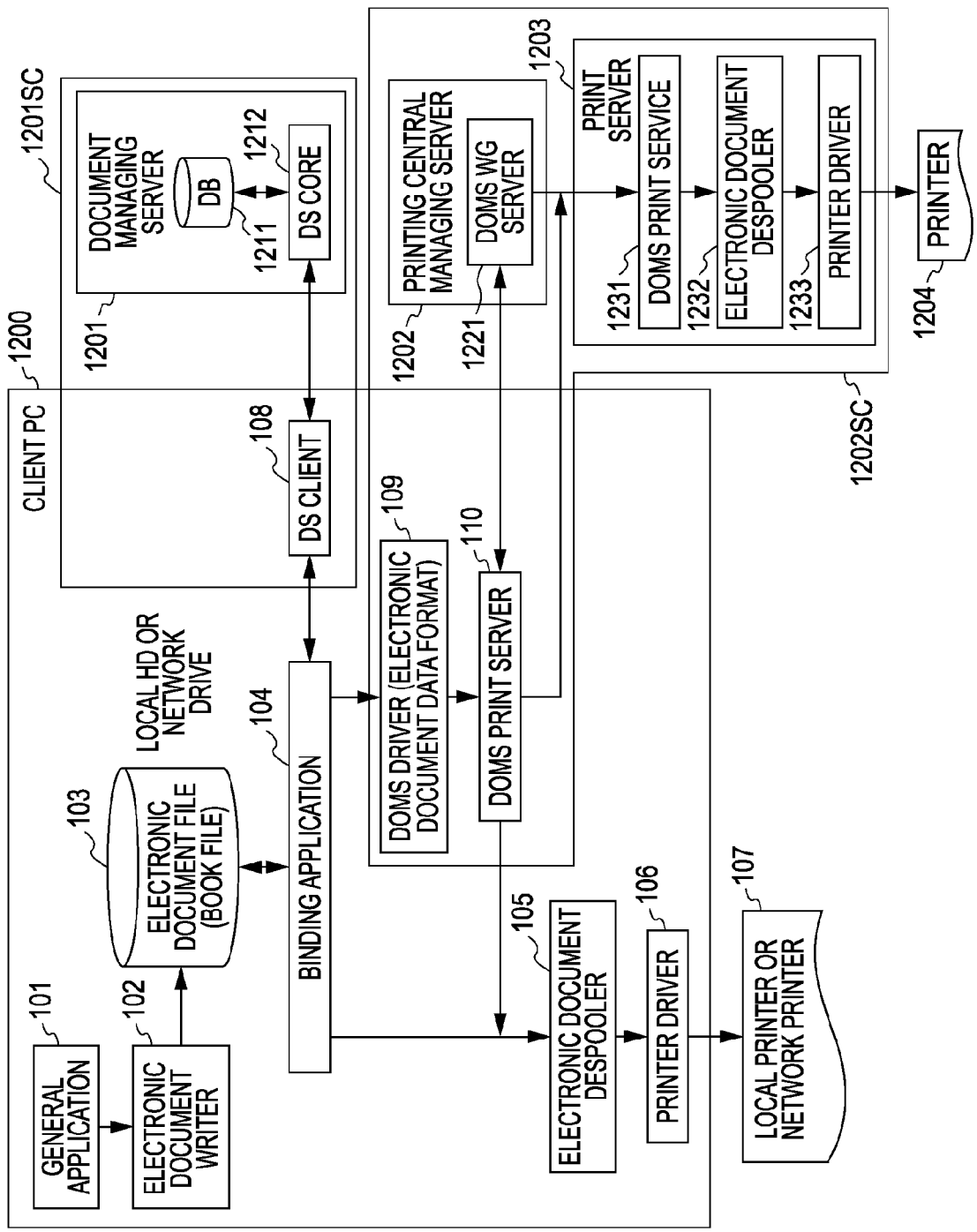
FIG. 12 is a block diagram illustrating a configuration of a client-server type document processing system according to the present embodiment.

FIG. 12 is a block diagram showing the configuration of a server/client type document processing system according to the present embodiment. A client document processing system 1200 has a configuration wherein a DOMS driver 109 which is a client module, a DOMS print server module 110, and DS (document service) client module 108 are added to the stand-alone type system. Note that DOMS is an acronym for Document Output Management Service. A document managing server 1201 and printing central managing service 1202 and printer server 1203 are connected to the client document processing system 1200. These servers are connected to the client document processing system 1200 with a normal network, but in the case that the server simultaneously functions as a client, the connection is made with inter-process communication simulating communication between networks. Note that in FIG. 12, both document managing server 1201 and printing central managing server 1202 are connected to the client, but there may be cases wherein only one exists on the network. If the connected server is a document managing server, the document managing server/client system 1201SC including the client module is added to the stand-alone type document management system.

On the other hand, if the connected server is the printing central managing server 1202, the printing managing server/client system 1202SC which includes the client module thereof is added to the stand-alone type document managing system.

The document managing server 1201 is a server to store the book file created/edited by the binding application 104. In the case of managing a book file with the document managing server 1201, the book file is stored in the database 1211 of the document managing server 1201 instead of, or in addition to, the local HD of the client PC. The storing and reading of the book file between the binding application 104 and document managing server 1201 are performed via the DS client 108 and DS core 1212.

The printing central managing server 1202 is a server to manage the printing of the book file stored in the client document managing system 1200 or stored in the document managing server 1201. A printing request for a client is sent to the DOMSWG server module 1221 of the printing central managing server 1202 via the DOMS driver 109 and print service module 110. In the case that the printing central managing server 1202 prints with a client printer 107, the electronic document data is passed to the electronic document despooler 105 via the DOMS print service module 110 of the client.

On the other hand, in the case that printing is performed by the print server 1203, the printing request is sent to the DOMX print service module 1231 of the print server 1203.

The printing by the print server 1203 is performed via the electronic document despooler 1232 and the printer driver 1233.

The printing central managing server 1202 performs security checks for eligibility of the user issuing the printing request, and saves a log of the printing processing. Thus, the document processing system can be realized as a stand-alone or as a client server system.

<Content of Preview Display>

As described above, upon the book file being opened by the binding application, the user interface screen 1100 shown in FIG. 10 is displayed. The tree unit 1101 is displayed as a tree showing the configuration of the open book (hereafter called "book of interest"). Three display methods are prepared for the printing preview unit 1102 according to user specification. The first is a "document view mode" which displays the document page without change. With the "document view mode", the content of the document page belonging to the book of interest is reduced and displayed. In this case, the layout of the document is not reflected in the display of the preview unit 1102. The second is a "print view mode". With the "print view mode", the document page is displayed in the form with the layout of each document page reflected. The third is a "simple print view mode". With the "simple print view mode", the content of the document pages is not reflected in the display of the preview unit 1102, but only the layout is reflected.

Next, before describing the features of the embodiments of the present invention, the configuration of the document processing system having a host computer 100 (equating to the information processing apparatus of the present invention) and printer 107 applicable to the present embodiment will be described. Note that the configuration of the host computer 100 (hereafter, may also be called client) is the same as that described with reference to FIG. 2, so common portions thereto will have the same reference numerals, and the description thereof will be omitted. Also, the printer 107 is applicable, whether a local printer connected to the client or a printer 1204 (FIG. 12) connected to a server.

Figure 13:
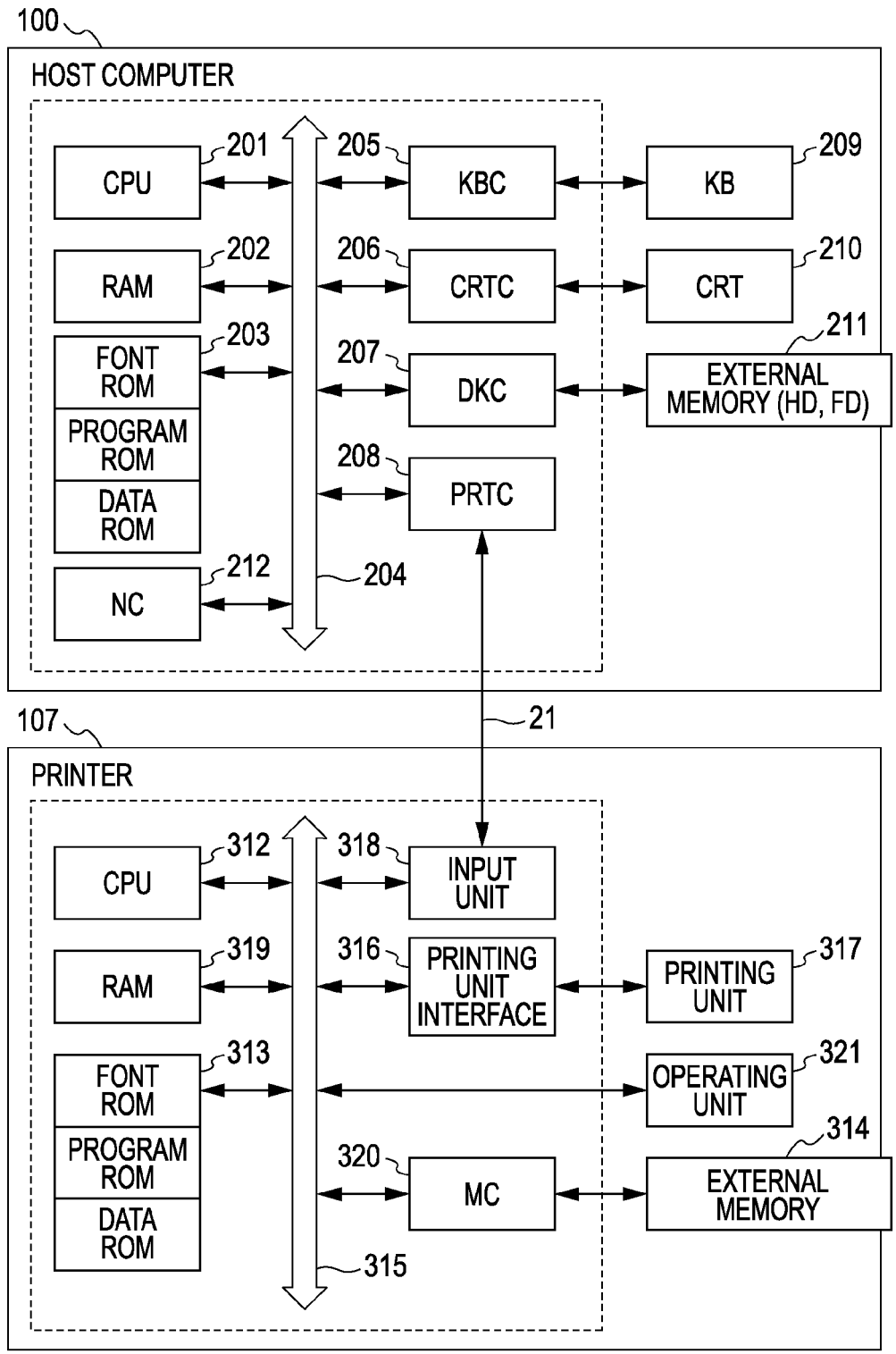
FIG. 13 is a block diagram to describe a configuration of a host computer and printer in a document processing system according to the present embodiment.

FIG. 13 is a block diagram for describing the document processing system according to the embodiments of the present invention. Note that as long as the functions according to the present embodiment are executed, a single apparatus, a system made up of multiple apparatuses, or a system performing processing with connections via a network such as a LAN or WAN is applicable to the present invention. Note that the configuration of the host computer 100 is the same as that described with reference to FIG. 2, so the description thereof will be omitted.

The printer 107 is controlled with the CPU 312. The CPU 312 outputs an image signal as output information to the printing unit (printer engine) 317 connected to the system bus 315 via the printing unit interface 316, based on the program stored in the ROM 313 (program ROM) and the program loaded in the RAM 319 from the external memory 14. Also, the program ROM of the ROM 313 has the control program of the CPU 312 stored therein. The font ROM of the ROM 313 has font data to be used in the event of generating output information stored therein, and the data ROM of the ROM 313 has information and so forth used with the host computer 100 stored therein.

Communication processing can be made between the CPU 312 and the host computer 100 via the input unit 318, and the information and so forth of the printer 107 is notified to the host computer 100. The RAM 319 is RAM which functions as primary memory, work area, and so forth of the CPU 312, and is configured so that the memory capacity thereof can be expanded with the option RAM connected to an unshown extension port. Note that the RAM 319 is used as an expansion region for output information, an environment data storage region, or NVRAM, and so forth. The external memory 314 such as the above-described hard disk (HD), IC card and so forth are subject to access control by a memory controller (MC) 320. The external memory 314 is connected as an option, and stores font data, emulation programs, form data, and so forth. Also the operating panel 321 has switches and LED display devices and so forth disposed thereupon.

Also, the above-described external memory 314 is not limited to one, and multiple external memory devices or modules may be provided, whereby a configuration may be made to connect multiple external memory devices or modules storing programs which understand printer control languages of different language systems and option cards in addition to built-in fonts. Further, an unshown NVRAM may be provided to store the printer mode setting information from the operating panel 321.

The host computer 100 has the files, applications, despooler, driver, and so forth as describe above with reference to FIG. 1. An electronic document file 103 is generated by converting a document file generated by the application 101 (application data) via the electronic document writer 102. As described above, the electronic document file 103 can be opened by the binding application 104, and the binding application displays an operating screen such as that shown in FIG. 10 for example on the display unit 210. A great difference between the binding application 104 and a general-use general application 101 is that the binding application 104 has printing setting functions which a normal printer driver 106 would provide. With these printing setting functions, the binding application 104 differs from the general-use application 101, whereby editing functions such as page reordering, copying, and deleting of a document can be performed. Further, the binding application 104 can perform function settings for the printer 107 as to the electronic document file, whereby printing can be performed using a specified printer. Note that the binding application 104 described in the present embodiment is also called a printing setting application.

<Data Configuration of Document File>

FIG. 14 is a diagram describing the data configuration of a document file which the application 101 according to the present embodiment handles. The document file equates to the electronic document file 103 in FIG. 1, and for example is stored in the external memory 211 shown in FIG. 13, but may be stored in the database 1211 of the document managing server 1201 in FIG. 12.

In FIG. 14, document configuration information 701 stores information relating to the configuration of a document displayed in the tree view 1101 of the application operation screen shown in FIG. 10. Document detail setting information 702 is a region for storing information which can be set for an entire document. Chapter detail setting information 703 is a region for storing information which can be set for each chapter. Page detail setting information 704 is a region for storing information which can be set for each page. Document information 705 stores drawing information for each document page, and the information used to display on the printing preview 1102 on the right side in FIG. 10 is stored by page units. Note that this document file includes other necessary information for each document, but the descriptions thereof will be omitted here.

FIG. 15 is a diagram describing the data configuration of the document detail setting information 702 in FIG. 14 in further detail.

801 denotes the document page setting information, 802 denotes document finishing information, 803 denotes document editing information, 804 denotes document paper supply information, 805 denotes index sheet information, whereby this information is stored as document detail setting information 702.

<Output Sequence by Document Processing System>

Book file output processing will be described with reference to FIG. 16. FIG. 16 is a flowchart showing processing sequences by the binding application and despooler. Hereafter the binding application and despooler are collectively called the system.

In step S1601, the binding application reads both of the printing document (equating to the above-described book file) and the printing instruction document from the hard disk according to user instructions. The printing instruction document is appended to the printing document to be printed, and is an electronic document wherein information of how to print the printing document to be printed. The printing document and the printing instruction document may be integrated into one document file. The printing instruction document is generated by the user setting the printing setting information on the user interface screen shown in FIG. 10.

The overall configuration of the printing instruction document is such as that shown in FIG. 17. First, the printing instruction document includes a printer device name 1701 as the output object, and a printing document name 1702 which is subject to printing. Further, the printing instruction document includes a page placement information unit 1703 to describe how to place each page of the printing document and in what order to print, and a printer instruction information unit 1704 to describe instructions to the printer as the output object.

FIG. 18 is an example of the page placement information unit to describe how to place each page of the printing document and in what order to print.

A page layout 1801 shows how many pages worth of data to print on one sheet, and can be one page per sheet, two pages per sheet, four pages per sheet, sixteen pages per sheet, and so forth. A placement sequence 1802 is the placement sequence at the time of printing multiple pages of data on one sheet, and can be left to right, right to left, and so forth.

A stamp 1803 draws an image or the like on a sheet, and can have an image such as "Secret", "Confidential", and so forth. Number of copies 1804 is information specifying the number of print copies. Binding direction 1805 specifies the direction to bind the printed material, and binding margin 1806 shows the binding margin size for the printed material. White space 1807 is information specifying the white space set in the circumference of each page.

Imposition 1808 illustrates the method of imposition, and can be 1×1 imposition, N×N imposition, saddle-stitching binding, case work, four-fold, and so forth.

Opening direction 1809 is setting following the imposition 1808, and specifies which direction to open the book in the case of performing saddle-stitching or case work imposition. As opening directions, open to left, open to right, open to top, open to bottom can be set.

Volume 1810 specifies the number of sheets included in one unit of a bound book in the case of setting saddle-stitching binding.

The binding application 104 applies the above-described page placement setting as to the document data (book file) to be printed which is indicated by the printing document name 1702, and sends the data after setting to the printer specified with the printer apparatus 1702 via the despooler 105.

FIG. 19 is a diagram showing an example of the printer instruction information 1704. Sheet output method 1901 is an item to specify the processing of the output sheet, and stapling, sorting, saddle-stitching stapling and so forth can be set. Printing method 1902 is an item to specify simplex printing or duplex printing and so forth. Sheet supply method 1903 is an item to specify the sheet supply unit to supply the sheets, and can be upper cassette, lower cassette, manual feed, and so forth. Resolution 1904 is an item to specify resolution, and can be fine which is high resolution or normal which is normal resolution.

With the present embodiment, after the information in FIG. 19 is set in the printer specified by the printer device name 1701 with the settings described above, printing is performed by sending the data to the printer.

On the other hand, FIG. 20 is an example of the configuration of instruction information at the time of instructing printing to the printer. The instruction information is called DEVMODE with Windows OS from Microsoft. DEVMODE is a configuration storing content which can be set with a setting screen of the printer driver with Windows OS, and is provided by the OS. The printer driver receiving the printing data references DEVMODE in the event of generating a printing control command to send to the printer. The printer driver generates a printing control command (also called printing data or page description language) to cause the printer to function according to the content described in DEVMODE and sends this to the printer. Note that with the present embodiment, in order to describe the document processing system operating under the Windows OS, DEVMODE is described as an example. However, an OS generally has a function for realizing processing corresponding to device functions relating to portions dependent on the device such as printer functions. Therefore, using another OS would be essentially the same as the present invention.

DEVMODE has a public shared portion and an expansion portion which can be set for each printer. In FIG. 20 of the present embodiment, description will be simplified, with only the related portions identified.

Device name 2001 includes a printer name as the output object. DEVMODE size 2002 stores the size of each of the shared portions and expansion portions and a total size. The size of the output sheet is stored in sheet 2003. The transport direction (vertical/horizontal) of the sheet is stored in the sheet direction 2004. Color mode 2005 has whether to print the data in color or print in monochrome stored therein, in the case of a color printer.

Page layout 2006 stores how many pages worth of data to print on one side of one sheet.

Binding direction 2007 stores the direction of binding the printed material. Also, processing may be performed in sequence with the sheet output method 2010.

Sheet output method 2010 is an item specifying the processing of the output sheets, and can be stapling, sorting, and so forth. The location of performing processing may be performed in sequence with the binding direction 2007.

Binding Margin 2008 is an item to specify width of Binding Margin.

Printing method 2009 is an item to specify simplex printing, duplex printing, and so forth. Number of copies 2011 is an item to specify the number of printed copies.

Returning to the description in FIG. 16, in step S1601 the binding application receives the printing document and printing instruction document (S1601) and opens the printing instruction document (S1602).

The binding application reads the printer device name 1701 specified in the printing instruction document (S1603) and researches whether the printer device name is specified in the printing instruction document (S1604).

In the case that the printer device name is not specified, the binding application obtains a default printer name registered beforehand in a predetermined storage location, and sets the printer device as the output object (S1605).

Next, the binding application checks whether the printer driver corresponding to the printer determined as the output object (object printer) is installed (S1606).

In the case the binding application determines that the printer driver is not installed (No in S1606), the user is notified that the printer is unusable (S1607).

On the other hand, in the case the binding application determines that the printer driver is installed, the DEVMODE of the object printer is obtained from the printer driver of the object printer (S1608).

After changing the DEVMODE obtained in S1608 as necessary (S1609), the binding application notifies the DEVMODE to the printer device (S1610).

Next, the despooler expands the content of the printing document based on the printing instruction document, and sends the expanded data to the printer device (S1611).

The despooler notifies the printer that all of the printing data has been sent (S1612), and upon ending all of the printing, notifies this fact to the user (S1613), and ends the printing.

<Printing Instruction Document Creating Processing by Binding Application>

The processing for the binding application 104 to create a book file and the above-described printing instruction document according to the capability of the printer selected by the user will be described.

The user instructs selection of the printer and printing execution as to the binding application 104. In accordance with these instructions, the binding application 104 uses a printer driver SDK API to inquire of the printer driver as to the printing function attribute information and printing ability attribute information via the electronic document despooler 105.

The printing function attribute information is information indicating printing functions which can be executed with a printing device and printing functions which can be specified with a printer driver. Specifically, this is function information which can be specified with a printer driver, such as duplex printing, N-UP function, stapling function, hole-punching function, Z-fold function, saddle-stitch binding, case work binding and so forth.

Also, printing ability attribute information is information in the printing function information which shows the range of printing functions which can be executed with the OS and printer driver. Specifically, printer driver ability information includes the sheet size and type of sheet which can be subjected to printing, the greatest number of copies to be specified, tone value for monochrome printing, and color-space and color profiles for color printing, and so forth.

The printer driver notifies the printing function attribute information and printing ability attribute information to the binding application 104 as a return value as to the called printer driver SDK API function from the binding application 104 from the electronic document despooler 105.

The electronic document despooler 105 issues various types of printing attribute settings and printing instructions to the printer driver by using the printer driver SDK API. Also, the electronic document despooler 105 may issue printing settings using Windows (registered trademark) SDK API provided with the GDI of the OS (e.g. printing settings employing DEVMODE configuration) and printing instructions to the printer driver. Note that GDI is an acronym for Graphical Device Interface.

Upon the electronic document despooler 105 issuing various types of printing attribute settings and printing instructions using the printer driver SDF API, the printer driver generates printing control commands based on the printing attribute settings.

On the other hand, upon the printing settings and printing instructions using the normal Windows (registered trademark) SDK API from the electronic document despooler 105 is performed, the printer driver generates a printing control command based on the printing attribute settings and printing instruction function called from the OS. Consequently, printing output of the object document can be made with the printer.

The printer driver SDK API is a unit to notify various types of information and various types of data between the application program and printer driver program. API is an arbitrarily programmable function or an application program interface in a data format.

As described above, the DEVMODE which can be instructed with the SDK API has a portion common to every public company and an expansion portion which can be set for each printer. The above-described binding application 104 being able to obtain printing function attribute information or printing capability information from the printer driver, or issuing printing instructions using the DEVMODE configuration is because the printer driver corresponds to the printer driver SDK API. Also, this is limited to the case wherein the printer driver does not have an expanded DEVMODE.

Therefore, in the case that the printer driver does not correspond to the printer driver SDK API, or in the case the printer driver has an expanded DEVMODE, the binding application 104 cannot perform printing instructions according to the printer capability. This is because in the case that the printer driver does not correspond to the printer driver SDK API, the binding application has no interface to issue printing instructions to the printer driver.

Thus, in the case that the binding application cannot perform printing instructions as to the printer driver, the user himself needs to directly set the printer driver. Also, depending on the function, if a common function is duplicated and set for both the binding application 104 and printer driver, problems can occur. With such a function, the user needs to not only directly instruct the printer driver but also needs to delete the printing settings on the binding application side.

Next, in a document processing system according to an embodiment of the present invention, processing to correspond to printing with a printer driver which does not correspond to the binding application (printer driver which does not correspond to the printer driver SDK API) will be described.

<Printing Processing with Document Processing System of Present Embodiment>

Figure 21:
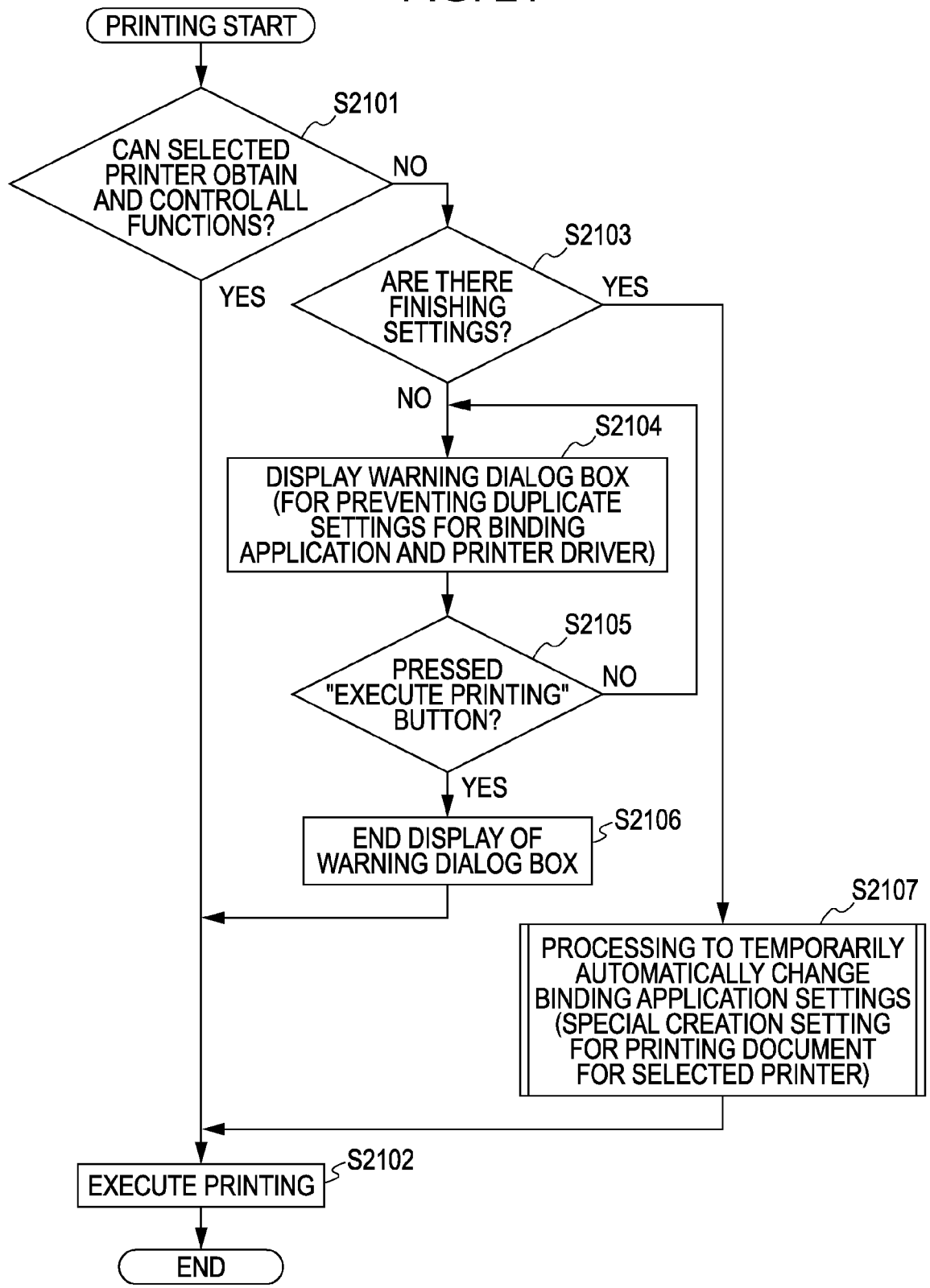
FIG. 21 is a flowchart illustrating an example of printing processing with the document processing system according to the present embodiment.

FIG. 21 is a flowchart showing the printing processing in the case of using a printer driver of a printer which does not correspond to a binding application 104 in a document processing system according to the present embodiment.

First, the user instructs printer selection and printing execution as to the binding application 104. The binding application 104 determines whether or not the selected printer driver does not correspond to the binding application, in accordance with the instructions (S2101). The determining processing S2101 equates to the first determining processing.

Specifically, the binding application sends the DEVMODE with the selected printer driver name described as to the determining API to determine whether or not the printer is a corresponding printer. In the case the binding application receives a replay that from the determining API that the printer is a corresponding printer, the binding application determines this is controllable (Yes in S2101), and in the case a response is not received indicating a corresponding printer, determines this is not controllable (No in S2101).

In the case of determining Yes in S2101, the binding application performs normal book file printing processing as described above (S2102).

On the other hand, in the case that No is determined in S2101, the binding application 104 determines whether or not there are any settings which the selected printer cannot control within the printing setting set via the setting screen of the binding application (S2103). Specifically, the binding application determines whether or not any finishing processing (e.g. hole-punching, stapling, saddle-stitch binding) is included in the printing settings set by the user. Note that finishing processing is processing to be executed as to printed sheets. In the case that finishing processing is included in the setting items set by the user via the setting screen of the binding application, the binding application determines that uncontrollable settings are included as to the selected printer.

The reason for determining Yes in S2103 in the case that finishing processing is included in the printing settings will be described. In the case the Yes is determined in S2103, the printer driver executes finishing specifying and imposition processing in accordance with such finishing. In the case that finishing specifications set as to the binding application remain, both of the binding application and printer driver execute the imposition processing for finishing, whereby the user cannot obtain desired printing results. Therefore, in the case that finishing processing is included in the printing setting information set with the binding application, the binding application determines Yes in S2103 in order to delete the imposition with the binding application.

In S2103, in the case that the expansion portion of the DEVMODE is included in the printing settings, and that these printing settings are applied to the printer driver, determination may be made whether to accompany the imposition of the printer driver. In the case that the expansion portion of the DEVMODE is included in the printing settings, and that these printing settings are applied to the printer driver, in the case of accompanying the imposition of the printer driver, the binding application determines Yes in S2103. Note that the determining processing in S2103 equates to the second determining processing.

Figure 24:
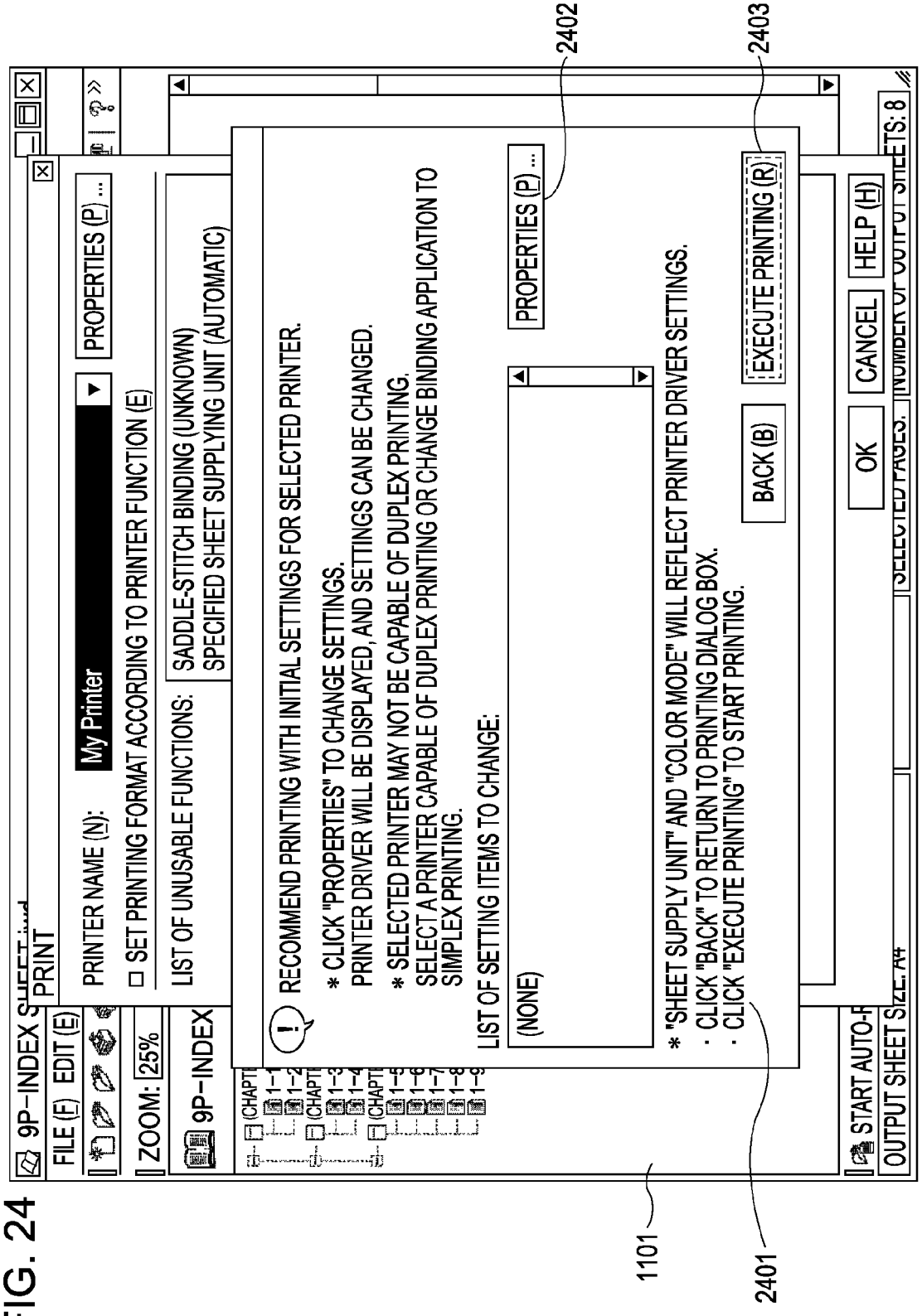
FIG. 24 is a diagram illustrating an example of a user interface screen to execute printing with the document processing system according to the present embodiment.

With the determining processing in S2103, in the case determination is made that uncontrollable settings are included as to the selected printer, the binding application displays a warning screen such as in FIG. 24. This is performed so that the binding application realizes the imposition processing executed according to the set content.

The warning screen in FIG. 24 is to prevent duplicate settings (duplicate drawings based on same settings) with the binding application 104 and the printer driver properties. The user displays the setting screen of the printer driver of the selected printer by pressing the properties button (instruction portion) 2402 in FIG. 24, and can confirm the printing setting information set in the current printer driver.

In S2105, in the case that the use instructs printing execution (in the case that 2403 in FIG. 24 is pressed), the binding application ends the display of the warning message 2401 in FIG. 24 (S2106), and performs printing of the book file (S2102).

On the other hand, in the case determination is made in step S2103 that uncontrollable settings are included in the selected printer, the binding application 104 changes or deletes a portion of the printing settings, and creates a printing instruction document according to the capability of the selected printer (S2107). The details of S2107 will be described with reference to FIG. 22.

The binding application then performs printing of the book file (S2102).

Figure 22:
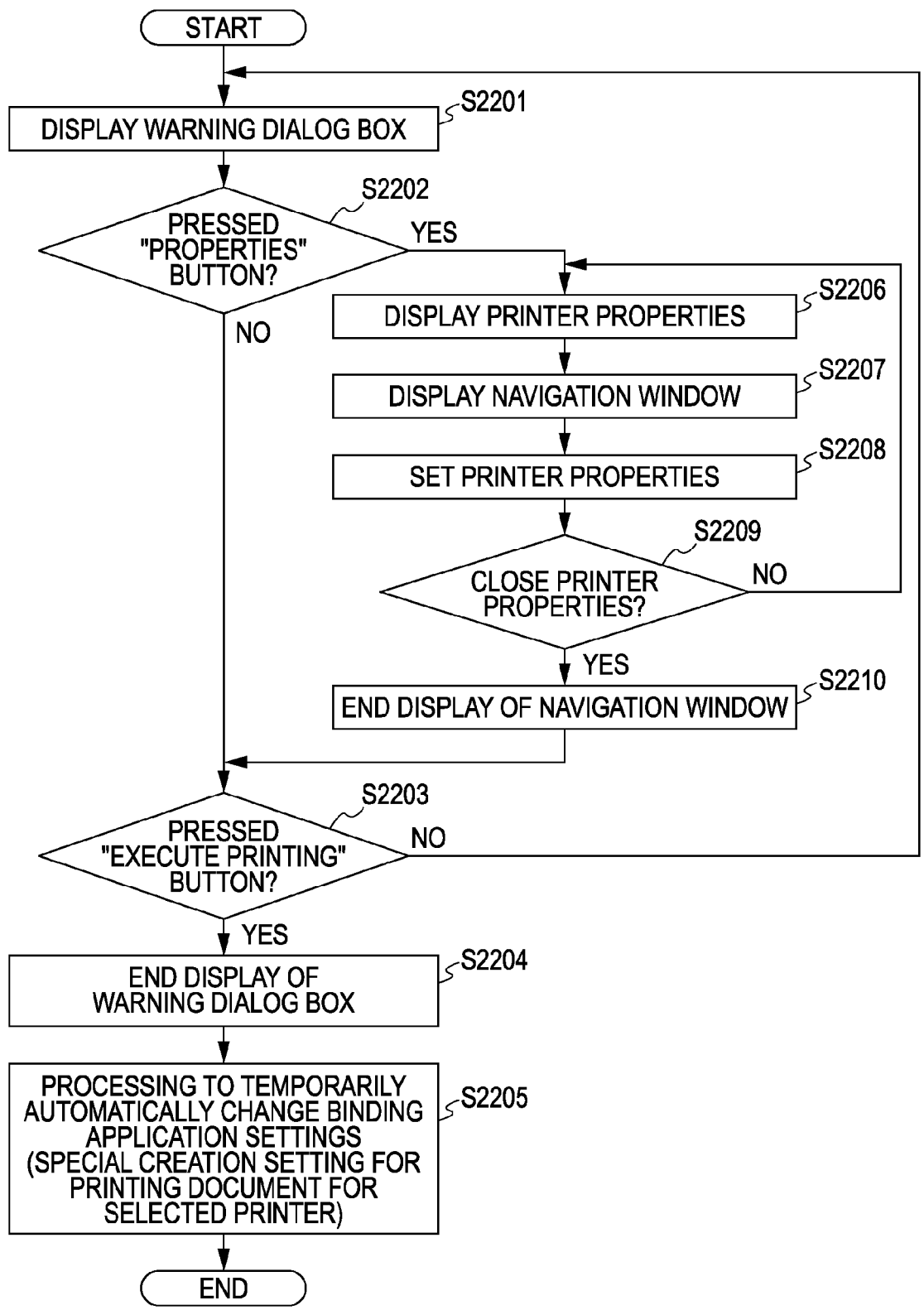
FIG. 22 is a flowchart illustrating an example of printing processing with the document processing system according to the present embodiment.

FIG. 22 is a flowchart describing the details of step S2107 in FIG. 21. The binding application displays a warning dialog in FIG. 25 (S2201). In the case that items which cannot be instructed as to the selected printer are included in the printing settings the user has set using the binding application, the warning dialog 2501 announces which item this is to the user. For example, in the case that a finishing processing setting is included in the printing settings set by the user, the binding application displays screen 2501 in FIG. 25. Finishing processing is processing to be executed on printed sheets, so there may be cases wherein this is described as post-printing processing. By pressing 2502 in FIG. 25, the user can change the settings as to the printer driver of the selected printer.

Figure 26:
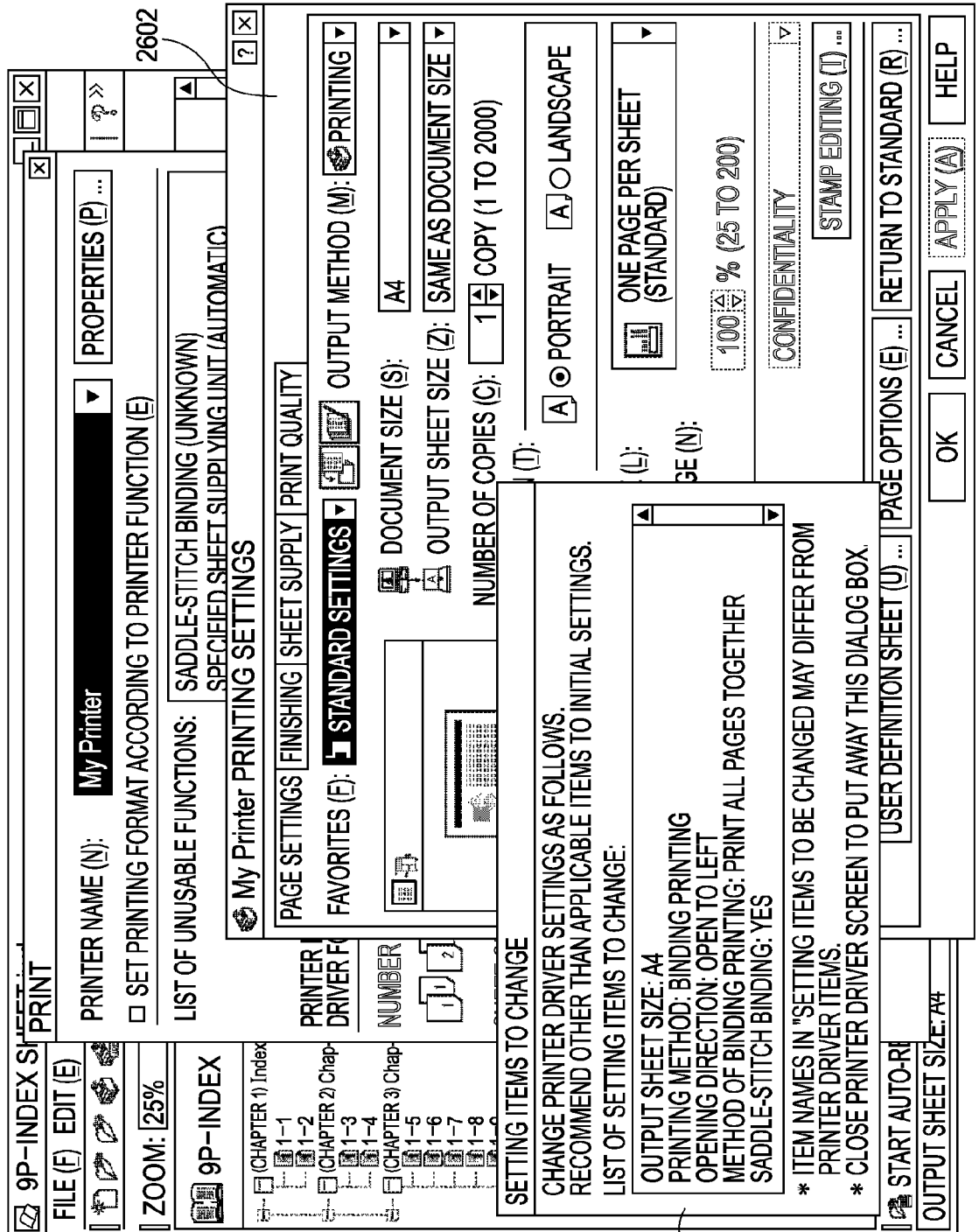
FIG. 26 is a diagram illustrating an example of a user interface screen to execute printing with the document processing system according to the present embodiment.

In step S2202, the binding application determines whether or not the properties button 2502 of the selected printer which is on the warning dialog has been pressed. In the case that the properties button 2502 has been pressed by the user, the binding application displays the setting screen 2602 of the printer driver of the selected printer (S2206). Further, the binding application displays a navigation window 2601 in FIG. 26 (S2207). Note that the navigation window is a screen to notify the setting content to be set by the printer driver to the user. For example, FIG. 26 notifies that settings should be made as "sheet size: A4", "printing method: binding printing", "opening direction: open to left", "binding printing method: print all pages together", "saddle-stitching: yes". The setting items displayed here are items relating to "binding printing". The binding application sets "binding printing" beforehand, and in the case that a non-corresponding printer is selected, the binding application has the items to be set in the printer driver. The navigation window in FIG. 26 is displayed using this holding information. Note that the setting content of each setting item are values set via the setting screen of the binding application. Also, with the present embodiment, "binding printing" is exemplified as finishing processing, but in addition to this, "hole-punching processing", "stapling processing" may be given as finishing processing. Accordingly, the binding application has an item relating to "hole-punching" and an item relating to "stapling" as holding information.

FIG. 26 is a diagram showing an example of the setting screen 2602 of the printer driver and the navigation window 2601 displayed. That is to say, the binding application displays the setting screen of the printer driver and the navigation window, whereby the user can readily set appropriate printing setting information to a setting screen of the printer driver while confirming the navigation window.

Next, the user sets the printing setting information as to the setting screen of the printer driver while viewing the navigation window (S2208). In step S2209, the binding application determines whether or not instructions have been received to close the setting screen of the printer driver (S2209), and ends the display of the navigation window according to instructions to close the setting screen of the printer driver (S2210).

Figure 25:
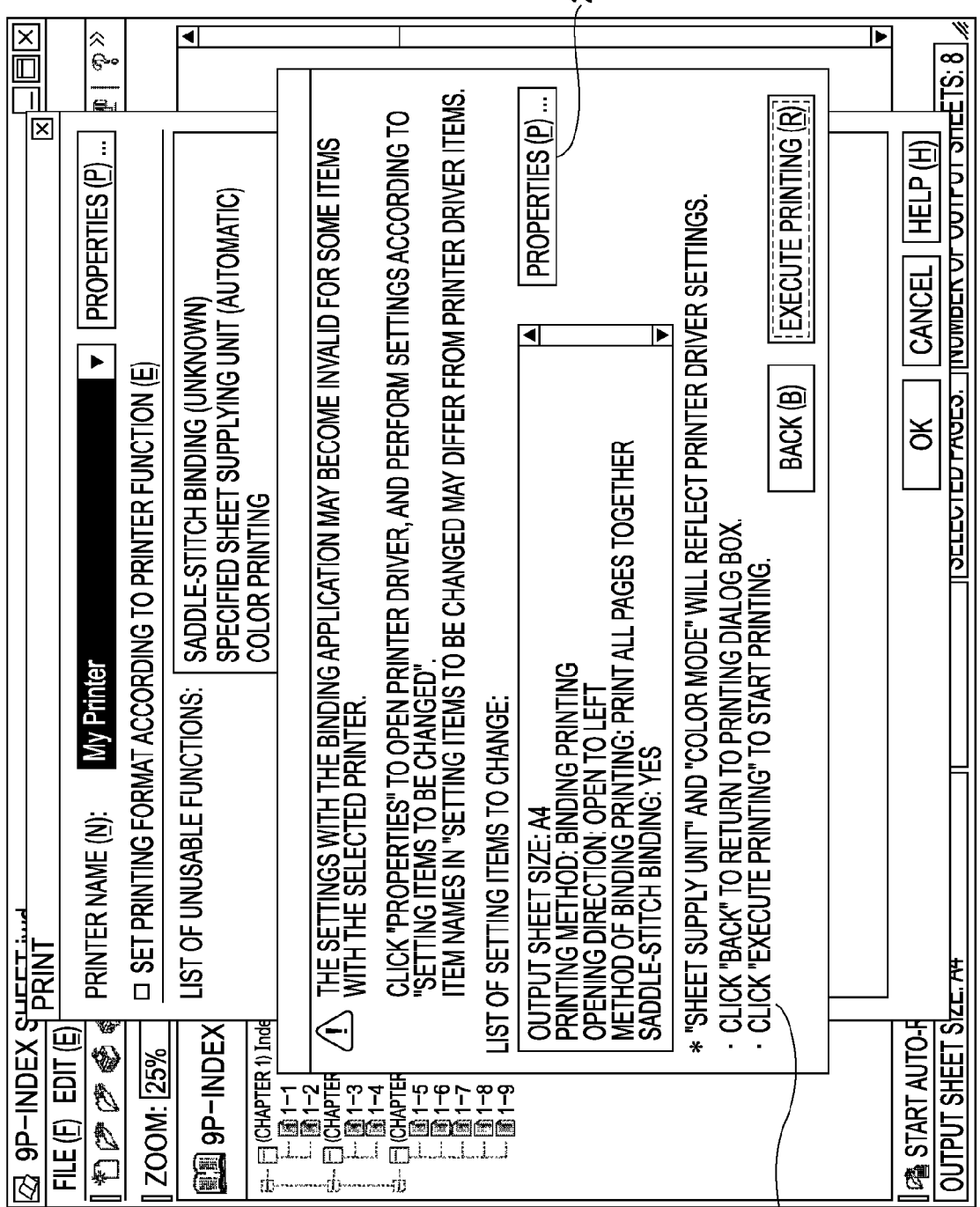
FIG. 25 is a diagram illustrating an example of a user interface screen to execute printing with the document processing system according to the present embodiment.

Thereafter, in the case that the user instructs printing execution (S2203), the binding application ends the display of the warning dialog 2501 in FIG. 25 (S2204), changes a portion of the printing setting of the binding application 104, and generates a printing instruction document based on the printing settings after the change (S2205). Specifically, the binding application 104 changes the settings for the points where problems occurs in the output result if duplicate settings are made with the printer driver. For example, the binding application 104 uses the navigation window to notify "printing method: binding printing". In the case that the user uses the setting screen of the printer driver according to this instruction and sets "printing method: binding printing", both of the binding application and printer driver execute the imposition for "binding printing: saddle-stitch binding:", whereby the printing results desired by the user cannot be obtained. Therefore, the binding application executes the processing in S2205, and deletes the "printing method: binding printing" of the binding application, whereby the duplicate settings are deleted. That is to say, in the case that the selected printing apparatus cannot be controlled, the binding application determines the items to be set with the printer driver (items to be changed in S2205) and items to be set with the binding application (items not to be changed in S2205).

FIG. 24 shows an example of a warning dialog displayed in step S2104 in FIG. 21, and is displayed to prevent duplicate settings (performing the same settings in two locations) between the binding application 104 and the printer driver.

By pressing the instruction portion 2402 in FIG. 24, the user starts the setting screen of the printer driver of the selected printer, whereby the settings as to the printer driver can be returned to the initial settings thereof.

Next, a specific example of processing for the binding application to perform will be described in the case that a printer which does not correspond to the binding application is selected by the user.

As an example, in the case that setting content for saddle-stitch binding as shown in FIG. 29 is instructed as to the binding application, the processing for the binding application to execute in order to obtain the printed material according to the setting content in FIG. 29 will be described.

Figure 27:
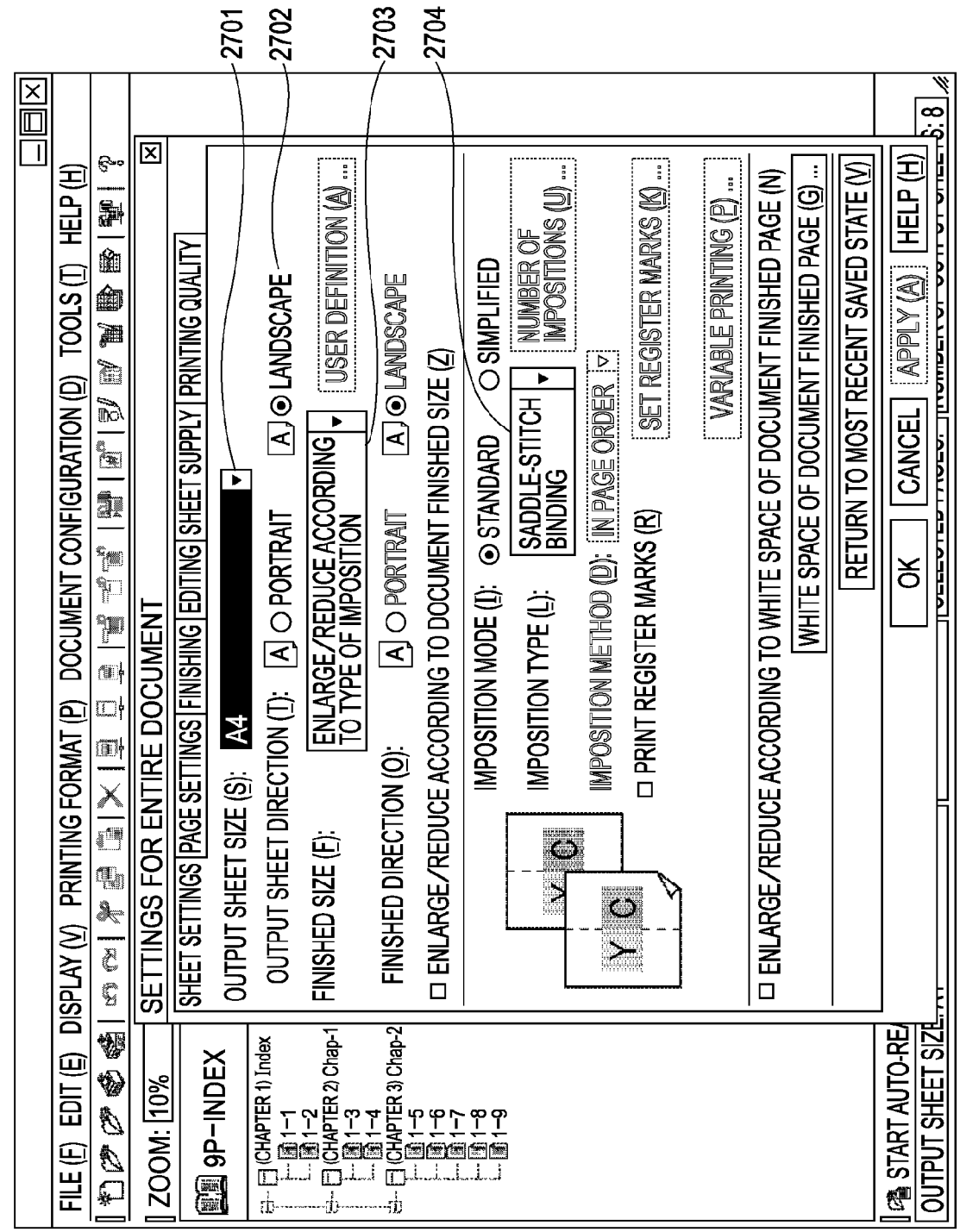
FIG. 27 is a diagram illustrating an example of a user interface screen to perform printing setting with the document processing system according to the present embodiment.

First the binding application displays the setting screen in FIGS. 27 and 28 according to the user instructions, and sets the printing setting information according to the user instructions.

The setting item 2701 in FIG. 27 is an item for specifying the sheet size in the event of printing, and the binding application sets A3 according to FIG. 29. The setting item 2702 in FIG. 27 is a setting item for specifying the direction of the sheet at time of printing.

In FIG. 29, the setting is "finished size: A4 (portrait)", so the binding application sets "landscape" so as to output A4 (portrait) lined up with A3.

The setting item 2703 in FIG. 27 is an item for specifying the finished size. The binding application sets "Auto (ENLARGE/REDUCE ACCORDING TO TYPE OF IMPOSITION)" so as to output A4 (portrait) lined up with A3.

The setting item 2704 is a setting item for specifying what order to line up and print the document (the type of imposition), and the binding application selects "saddle-stitching binding" according to FIG. 29. In this case, the binding application secures the region for two documents to line up on one sheet, and executes imposition processing in this region so that the output sequence when the book of printed sheets subjected to saddle-stitch binding is opened will be in the page order.

Next, the binding application performs detail settings according to instructions set via the screen in FIG. 28 and performs settings as to the printer.

The setting item 2801 in FIG. 28 is an item to specify the binding method, and setting item 2802 is an item to specify the opening direction of the book. Accordingly, the binding application selects "saddle-stitch binding" for the setting item 2801 according to FIG. 29, and selects "open to left" for the setting item 2802.

The user can set the details of the placement method of the document using the setting items 2803, 2804, and 2805, and can specify the white space of the binding margin with the setting item 2803.

Also, the setting item 2804 is a check box for specifying whether to print the document toward the side to be the binding side of the book. Also, setting item 2805 is a check box for specifying whether or not to perform a creeping correction function.

The setting item 2806 is an item for specifying whether or not to perform "saddle-stitch binding" with a post-processing apparatus attached to the printer, and upon the user selecting "folding and stapling" for the setting item 2806, a printing result state is output with processing through "saddle-stitching stapling" having been processed by the printer.

Thus, the binding application executes placement settings such as page sequence of the document as to the book file, and function settings as to the printer such as stapling. In the case of receiving printing instructions from the user, the binding application determines whether a printer which can correspond to the binding application has been selected, or whether a non-corresponding printer has been selected. This determination is the same as the determining processing in S2101 in FIG. 21.

In the case that determination is made that a corresponding printer is selected, page placement information in FIG. 30 (3001 through 3010) is generated.

On the other hand, in the case determination is made that a non-corresponding printer is selected, the binding application determines whether or not setting items which cannot be instructed as to the selected printer are included in the content set via the setting screen of the binding application. In FIG. 29, "binding finishing: yes" which is finishing processing is included as a setting item which cannot be instructed to the selected non-corresponding printer.

Accordingly, the binding application executes partial change processing of the printing setting as to FIG. 30. Note that by applying the present invention, FIG. 30 is changed into FIG. 31 (3101 through 3110). This is performed so that the binding application 104 does not execute page placement setting with consideration for finishing as to the document data to be printed which is to be passed to the printer driver, but executing is performed by the printer driver. The binding application changes the imposition information creating to binding printing from FIG. 30 to initial settings. Specifically, "imposition: saddle-stitch binding" in FIG. 30 is changed to "imposition: 1×1" in FIG. 31. Following this change, the opening direction and volumes become invalid, so these are changed to "OFF" in FIG. 31. That is to say, the binding application determines that imposition, opening direction, and volume settings are items to be set using a printer driver. On the other hand, the binding margin is set as "5 mm" in FIG. 30, so in order to generate a document with 5 mm of space on the left side, "binding direction: OFF" in FIG. 30 is changed to "binding direction: left binding" in FIG. 31. That is to say, the binding direction determines that the binding direction is an item to be set using the binding application.

Thus, with this example, the printer driver performs instructions for imposition processing related to binding (i.e. drawing processing wherein document and pages are placed for saddle-stitch binding printing) and binding finishing as to the printer (e.g. saddle-stitch binding by an inline finisher). Therefore, the binding application changes the printing setting items related to binding to the initial settings.

In the case that the binding application 104 does not change as shown in FIG. 31, the printer driver side receiving the information also performs the binding imposition (as set by the printer driver) (i.e. binding imposition is performed in duplicate). The processing in S2205 is executed to prevent such duplicate imposition.

Next, the setting operations to the printer driver side in the printing screen in FIG. 23 will be described. Let us say that in the setting item 2301 in FIG. 23, for the printer (printer driver) used for printing, a device (MFP-1) which does not correspond to the binding application 104 is specified.

When the OK button is pressed to execute printing, the binding application 104 performs printing processing with the flow in the flowchart in FIG. 21. At this time, in the case that the printer selected above is a printer which does not correspond to the binding application, and further that printing setting which the binding application cannot control as to the printer, the warning dialog shown in FIG. 25 is displayed. Upon the user instructing the properties button on the warning dialog, the setting screen of the printer driver is displayed an simultaneously the navigation window in FIG. 26 is displayed.

The user performs saddle-stitching settings as to the printer driver according to the instructions in the navigation window while viewing the navigation window. Specifically, the user uses the setting screen of the printer driver, specifies the output sheet size to A4, the printing method to binding printing, and the opening direction to open to left, and turns stapling to ON.

Upon the user closing the setting screen of the printer driver to execute printing, the binding application 104 performs the processing in step S2205 in FIG. 22 (i.e. processing to change or delete a portion of the page placement information and printing instruction document), and executes printing. Note that S2205 is also described as a drawing control unit for executing the drawing processing. With this example, the page placement information shown in FIG. 30 is changed as shown in FIG. 31, and the instruction information to the printer as shown in FIG. 32 (3201 through 3204) is changed as shown in FIG. 33 (3301 through 3304). The binding application 104 then sends the printing instruction document which is page placement information and instruction information to the printer changed as shown in FIGS. 31 and 32 to the printer driver via the electronic document despooler 105.

FIG. 35 is a DEVMODE (3501 through 3511) wherein the binding application 104 in the present example has generated based on the printing instruction document subjected to the changes in FIGS. 31 and 32. On the other hand, FIG. 34 is a DEVMODE (3401 through 3411) which the electronic document despooler generates in the case of performing normal printing processing (i.e. the printing processing using a device corresponding to the binding application 104). The DEVMODE in FIG. 34 is created based on the printing instruction document generated without going through the processing in step S2107 in FIG. 21 which is shown in FIGS. 30 and 31.

Thus, even in a case of using a printer which does not correspond to the binding application 104 (non-corresponding printer), similar output results can be obtained as in a case of using a corresponding printer. For example, in the case that settings for a function which cannot be controlled as to the printer within the printing setting items set on the binding application are included, the binding application displays a navigation window which instructs the setting method with the printer driver. This has the advantage of suppressing setting misses by the user. Further automatically deleting printing settings which have no need to be set on the binding application side has the advantage of preventing problems from occurring due to duplicate settings with the printer driver.

On the other hand, in the case that an item which cannot be controlled as to the printer is not included in the printing setting item information which is set in the binding application, the printing settings on the binding application side are not deleted. Consequently, using the imposition function which the binding application uniquely has (e.g. creeping correction, moving the document closer to the binding position, or cover creating function for case work binding), printing can be made with a non-corresponding printer. This has the advantage of obtaining similar output results as the case of printing with a corresponding printer.

By employing the present invention, even in a case wherein a printer is selected which does not correspond to the integrated application, desired printing results can be readily obtained.

Note that the present invention can be applied to a system made up of multiple apparatuses (e.g. host computer, interface apparatus, reader, printer, and so forth), or can be applied to a single apparatus (e.g. photocopier, facsimile apparatus, and so forth).

Also, the present invention can be carried out by supplying a storage medium having a program code realizing the above-described embodiments recorded therein to a system or apparatus, and by a computer of such system or apparatus executing the program code stored in the storage medium.

In this case, the program code itself which is read from the storage medium executes the functions of the above-described embodiments, and the storage medium having stored the program code makes up the present invention. Also, cases are also included wherein, based on the instructions of the program code read by the computer, a portion or all of the actual processing is performed by the operating system (OS) which operates on the computer, and the functions of the above-described embodiments are realized by such processing. It goes without saying that the information processing apparatus of the present invention may be realized by a readable program.

Further, cases are also included wherein, after the program code read from the storage medium is written into the memory, a portion or all of the actual processing is performed by the CPU or the like, based on the program code instructions, and the functions of the above-described embodiments are realized by such processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-166356 filed Jun. 25, 2007, which is hereby incorporated by reference herein in its entirety.

What is claimed is:

1. An information processing apparatus capable of communicating with a printing apparatus, and having an application which sets printing setting information for a document to be printed and a printer driver which generates print data, the information processing apparatus comprising:
   a selecting unit arranged to select a printing apparatus;
   a first determining unit arranged to determine whether a printer driver of the selected printing apparatus is not supported by the application;
   a second determining unit arranged to determine whether the printing setting information set using the application includes printing setting information for which the application is not able to issue an instruction to a printer driver of a selected printing apparatus; and
   a display control unit arranged to display, along with a setting screen of the printer driver of the selected printing apparatus, a navigation window for displaying printing setting information which is set using the application and for which the application is not able to issue an instruction to the printer driver of the selected printing apparatus, as a screen different from the setting screen of the printer driver of the selected printing apparatus in a case where the first determining unit determines that the printer driver of the selected printing apparatus is not supported by the application and the second determining unit determines that the printing setting information set using the application includes the printing setting information for which the application is not able to issue an instruction to the printer driver of the selected printing apparatus,
   wherein the display control unit does not display the navigation window in a case where the first determining unit determines that the printer driver of the selected printing apparatus is not supported by the application and the second determining unit determines that the print setting information does not include the printing setting information for which the application is not able to issue an instruction to the printer driver of the selected printing apparatus.

2. The information processing apparatus according to claim 1, further comprising:
   a third determining unit arranged to determine whether or not a printing apparatus which can be controlled from the application is selected,
   wherein in a case the third determining unit determines that a printing apparatus which cannot be controlled from the application is selected, the second determining unit determines whether or not the printing setting information to be set using the printing driver is included in the printing setting information set by using the application.

3. The information processing apparatus according to claim 1, wherein the second determining unit determines whether or not post-printing processing to be performed as to a printed sheet is set in the printing setting information set by the application.

4. The information processing apparatus according to claim 3, wherein in a case the second determining unit determines that the post-printing processing is included in the printing setting information set using the application, so as to cause the printer driver to execute imposition processing relating to the post-printing processing, a drawing control unit is further provided to the application which is arranged to send document data to the printer driver without the imposition processing.

5. The information processing apparatus according to claim 1, wherein the display control unit displays a warning screen having printing setting items to be set using the printer driver, as well as an instruction unit to display a setting screen for the printer driver corresponding to the printing apparatus.

6. The information processing apparatus according to claim 4, wherein in a case the third determining unit determines that a printing apparatus which cannot be controlled by the application is selected, and the second determining unit determines that the printing setting information to be set using the printer driver is not included, the drawing control unit of the application imposes document data based on the printing setting information.

7. A method for an information processing apparatus capable of communicating with a printing apparatus, and having an application which sets printing setting information for a document to be printed and a printer driver which generates print data, the method comprising:
   selecting a printing apparatus;
   determining whether a printer driver of the selected printing apparatus is not supported by the application;
   determining whether the printing setting information set using the application includes printing setting information for which the application is not able to issue an instruction to a printer driver of a selected printing apparatus; and
   displaying, along with a setting screen of the printer driver of the selected printing apparatus, a navigation window for displaying printing setting information which is set using the application and for which the application is not able to issue an instruction to the printer driver of the selected printing apparatus, as a screen different from the setting screen of the printer driver of the selected printing apparatus, in a case where it is determined that the printer driver of the selected printing apparatus is not supported by the application and it is determined that the printing setting information using the application includes the printing setting information for which the application is not able to issue an instruction to the printer driver of the selected printing apparatus,
   wherein the navigation window is not displayed in a case where it is determined that the printer driver of the selected printing apparatus is not supported by the application and it is determined that the print setting information does not include the printing setting information for which the application is not able to issue an instruction to the printer driver of the selected printing apparatus.

8. A non-transitory computer-readable storage medium storing a computer-executable process, the computer-executable process causing an information processing apparatus capable of communicating with a printing apparatus, and having an application which sets printing setting information for a document to be printed and a printer driver which generates print data, to perform a method comprising;
   selecting a printing apparatus;
   determining whether a printer driver of the selected printing apparatus is not supported by the application;
   determining whether the printing setting information set using the application includes printing setting information for which the application is not able to issue an instruction to a printer driver of a selected printing apparatus; and
   displaying, along with a setting screen of the printer driver of the selected printing apparatus, a navigation window for displaying printing setting information which is set using the application and for which the application is not able to issue an instruction to the printer driver of the selected printing apparatus, as a screen different from the setting screen of the printer driver of the selected printing apparatus, in a case where it is determined that the printer driver of the selected printing apparatus is not supported by the application and it is determined that the printing setting information using the application includes the printing setting information for which the application is not able to issue an instruction to the printer driver of the selected printing apparatus,
   wherein the navigation window is not displayed in a case where it is determined that the printer driver of the selected printing apparatus is not supported by the application and it is determined that the print setting information does not include the printing setting information for which the application is not able to issue an instruction to the printer driver of the selected printing apparatus.

9. The method according to claim 7, further comprising:
   determining whether or not a printing apparatus which can be controlled from the application is selected,
   wherein in a case that it is determined that a printing apparatus which cannot be controlled from the application is selected, it is determined whether or not the printing setting information to be set using the printing driver is included in the printing setting information set by using the application.

10. The method according to claim 9, wherein in a case that it is determined that a printing apparatus which cannot be controlled by the application is selected, and it is determined that the printing setting information to be set using the printer driver is not included, the application imposes document data based on the printing setting information.

11. The computer-readable storage medium according to claim 8, further comprising:
   determining whether or not a printing apparatus which can be controlled from the application is selected,
   wherein in a case that it is determined that a printing apparatus which cannot be controlled from the application is selected, it is determined whether or not the printing setting information to be set using the printing driver is included in the printing setting information set by using the application.

12. The computer-readable storage medium according to claim 11, wherein in a case that it is determined that a printing apparatus which cannot be controlled by the application is selected, and it is determined that the printing setting information to be set using the printer driver is not included, the application imposes document data based on the printing setting information.

* * * * *